(12) United States Patent
Nagao et al.

(10) Patent No.: US 9,864,178 B2
(45) Date of Patent: Jan. 9, 2018

(54) REFLECTION IMAGING DEVICE AND METHOD OF PRODUCING REFLECTION IMAGING DEVICE

(71) Applicant: Sharp Kabushiki Kaisha, Osaka-shi, Osaka (JP)

(72) Inventors: Shinichiroh Nagao, Osaka (JP); Chikahiko Murata, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 106 days.

(21) Appl. No.: 14/783,112

(22) PCT Filed: Feb. 26, 2014

(86) PCT No.: PCT/JP2014/054662
§ 371 (c)(1),
(2) Date: Oct. 8, 2015

(87) PCT Pub. No.: WO2014/167904
PCT Pub. Date: Oct. 16, 2014

(65) Prior Publication Data
US 2016/0062097 A1    Mar. 3, 2016

(30) Foreign Application Priority Data

Apr. 12, 2013  (JP) ................................ 2013-083866

(51) Int. Cl.
*G02B 17/00* (2006.01)
*G02B 5/08* (2006.01)

(52) U.S. Cl.
CPC ......... *G02B 17/006* (2013.01); *G02B 5/0816* (2013.01); *G02B 17/002* (2013.01)

(58) Field of Classification Search
CPC ... G02B 17/002; G02B 17/006; G02B 5/0816
(Continued)

(56) References Cited

U.S. PATENT DOCUMENTS 2,748,659 A * 6/1956 Schroder ................ F21S 48/114
                                                              313/111
5,808,323 A * 9/1998 Spaeth ............... G02B 27/1086
                                                              257/88
(Continued)

FOREIGN PATENT DOCUMENTS

| JP | 2009-276698 A | 11/2009 |
| JP | 2009-276699 A | 11/2009 |
| JP | 4865088 B2 | 2/2012 |

OTHER PUBLICATIONS

Official Communication issued in International Patent Application No. PCT/JP2014/054662, dated Jun. 3, 2014.

*Primary Examiner* — Ricky D Shafer
(74) *Attorney, Agent, or Firm* — Keating & Bennett, LLP

(57) ABSTRACT

A reflection imaging device includes a first component board, a second component board, and flat plates. The first component board includes first planar reflectors perpendicular to a plate surface and first light transmissive bases extending parallel to the first planar reflectors. The first planar reflectors and the first light transmissive bases are alternately arranged. The second component board includes an inner plate surface bonded to an inner plate surface of the first component board opposed thereto. The second component board includes second planar reflectors perpendicular to the plate surface and the first planar reflectors and second light transmissive bases extending parallel to the second planar reflectors. The second planar reflectors and the second light transmissive bases are alternately arranged. The flat plates are bonded to the outer plate surfaces of at least one of the first component board and the second component board opposed thereto.

7 Claims, 35 Drawing Sheets

(58) Field of Classification Search
USPC .................................. 359/627, 850, 855
See application file for complete search history.

(56) References Cited

U.S. PATENT DOCUMENTS

| | | | | |
|---|---|---|---|---|
| 6,404,550 | B1* | 6/2002 | Yajima | G02B 27/283 |
| | | | | 348/E5.141 |
| 2006/0001970 | A1* | 1/2006 | Facius | G02B 27/102 |
| | | | | 359/489.17 |
| 2011/0181949 | A1* | 7/2011 | Hashikawa | G02B 17/006 |
| | | | | 359/463 |
| 2014/0254009 | A1* | 9/2014 | Otsubo | G02B 17/002 |
| | | | | 359/464 |
| 2015/0029585 | A1* | 1/2015 | Imamura | G02B 17/006 |
| | | | | 359/479 |

* cited by examiner

FIG.2
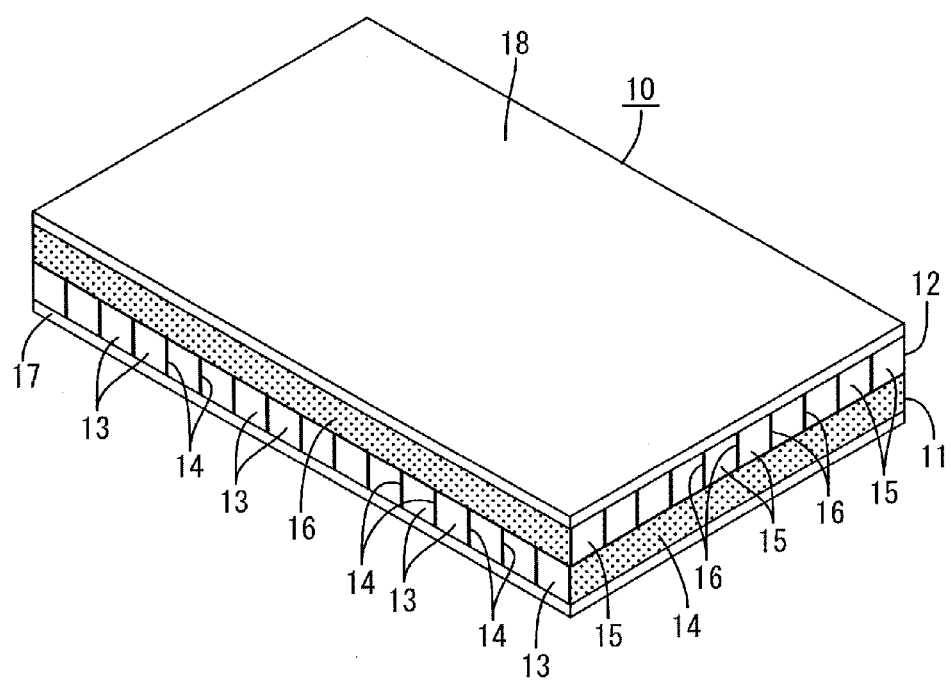
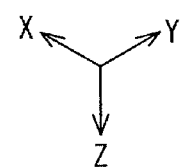

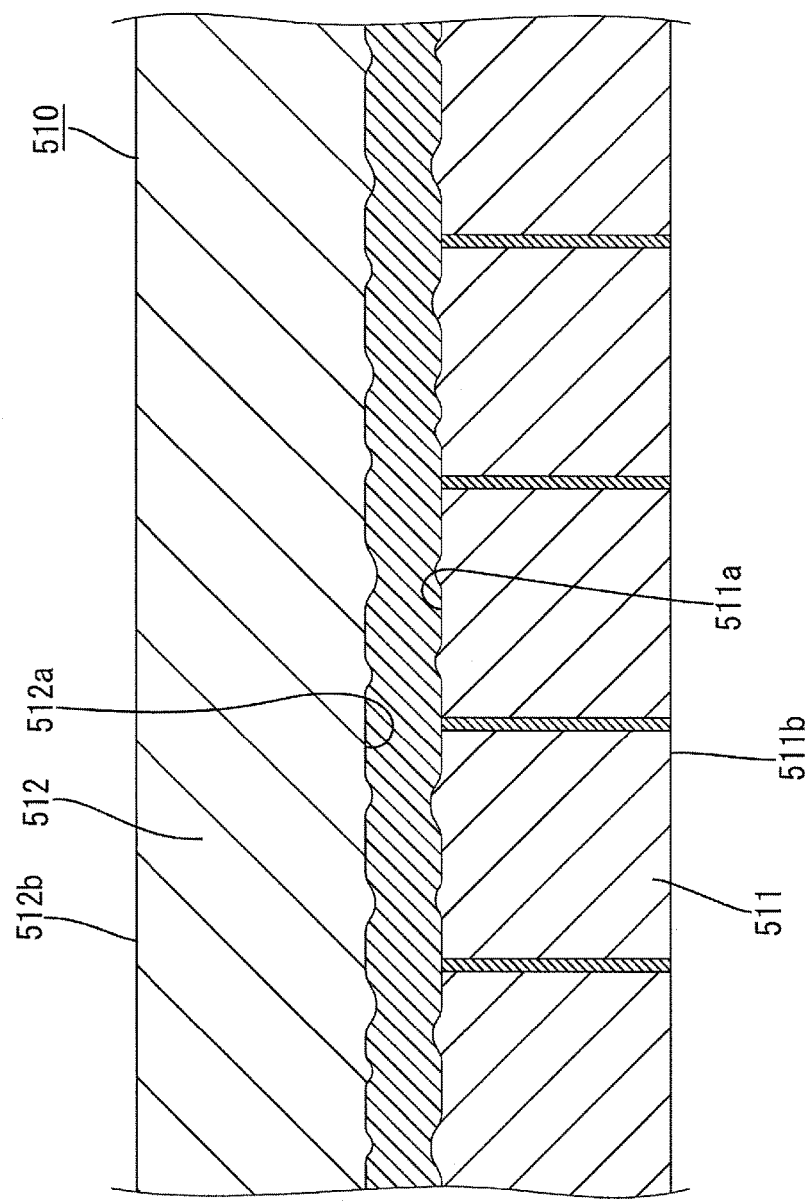

REFLECTION IMAGING DEVICE AND METHOD OF PRODUCING REFLECTION IMAGING DEVICE

TECHNICAL FIELD

The present invention relates to a reflection imaging device and a method of producing reflection imaging device.

BACKGROUND ART

A reflection imaging device for forming an image of an object to be displayed disclosed in Patent Document 1 has been known as an example of such a device. The reflection imaging device includes first and second light control panels. Each of the first and the second light control panels includes a transparent plate in which a number of planar light reflectors each having a strip-like shape are arranged perpendicular to one of surfaces of the transparent plate inside the transparent plate. Surface of the first and the second light control panels are opposed to each other such that the planar light reflectors of the first light control panel are perpendicular to those of the second light control panel. Rays of light from the object reflected off the planar light reflectors of the first light control panel are reflected off the planar light reflectors of the second light control panel to form the image of the object at a position such that the reflection imaging device is between the position and the object.

RELATED ART DOCUMENT

Patent Document

Patent Document 1: Japanese Patent Publication No. 4865088

Problem to be Solved by the Invention

In the reflection imaging device disclosed in Patent Document 1, the planar light reflectors of the first and the second light control panels are arranged perpendicular to the surfaces of the transparent plates. Therefore, smoothness of a plate surface of each of the first and the second light control panels is not high. This may results in reduction in optical performance. To increase the smoothness of the surface of each of the first and the second light control panel, polishing may be considered. For polishing the surfaces of the first and the second light control panels, a polishing step needs to be added to a production process and a polishing device needs to be added to production equipment. Furthermore, tact time in the polishing step is long. Therefore, a production cost increases. If the grinding is performed on the plate surfaces of the first and the second light control panels, the planar light reflectors may be removed due to a force of the polishing because a direction in which the planar light reflectors are arranged corresponds with a direction of the polishing. The first and the second light control panels may be damaged and yield may decrease.

Disclosure of the Present Invention

The present invention was made in view of the above circumstances. An object of the present invention is to reduce the cost and to improve the yield.

Means for Solving the Problem

The reflection imaging device includes a first component board, a second component board, and a flat plate. The first component board includes first planar reflectors perpendicular to a plate surface and first light transmissive bases having light transmissivity and extending parallel to the first planar reflectors. The first planar reflectors and the first transmissive bases are alternately arranged. The second component board includes an inner plate surface opposed to an inner plate surface of the first component board and bonded thereto. The second component board includes second planar reflectors perpendicular to the plate surface and the first planar reflectors. The second component board includes second light transmissive bases having light transmissivity and extending parallel to the second planar reflectors. The second planar reflectors and the second light transmissive bases are alternately arranged. The flat plate is in a single plate form. The flat plate is bonded to an outer plate surface of at least one of the first component board and the second component board opposed to the flat plate.

According to the configuration, rays of light from a side on which an object is placed enter the first component board through the outer plate surface thereof, transmit through the first transmissive bases while reflected off the second planar reflectors, transmit through the second light transmissive bases while reflected off the second planar reflectors, and exit from the second component board through the outer plate surface thereof. Because the first planar reflector and the second planar reflectors are arranged perpendicular to each other, a direction in which the rays of light exiting from the second component board through the outer plate surface thereof travel is substantially parallel to a direction in which the rays of light entering the first component board through the outer plate surface thereof travel. Therefore, a three-dimensional image of the object is formed at a position such that the reflection imaging device is between the object to be projected and the position at which the three-dimensional image is formed.

The first component board includes the first planar reflectors and the first light transmissive bases that are alternately arranged. The second component board includes the second planar reflectors and the second light transmissive bases that are alternately arranged. Therefore, the plate surfaces of the first component board and the second component board tend to have low smoothness and this may cause a decrease in optical performance. The flat plate in the single plate form is bonded to the outer plate surface of at least one of the first component board and the second component board with the flat plate opposed to the outer plate surface. The rays of light entering the outer plate surface and the rays of light exiting from the outer plate surface transmit through the outer plate surface. Because the flat plate is in the single plate form and the smoothness higher than the smoothness of the first component board and the second component board, the direction in which the transmitting light are less likely to irregularly change. According to the configuration, even if the smoothness of the outer plate surface to which the flat plate is bonded is not high, the optical performances of the reflection imaging device is less likely to decrease. Furthermore, polishing is not required for the outer plate surface to which at least the flat plate is bonded. Therefore, the production cost can be reduced and problems that may be caused by the polishing do not occur. This improves yield.

Preferable embodiments may include the following configurations.

(1) The flat plate and at least one of the first component board and the second component board may be bonded together with a flat plate adhesive layer therebetween. The flat plate may have a refractive index equal to a refractive index of at least one of the first light transmissive bases of the first component board and the second light transmissive bases of the second component board to which the flat plate is bonded. The flat plate adhesive layer may be made of material having a refractive index equal to the refractive index of the flat plate and the refractive index of the at least one of the first light transmissive bases of the first component board and the second light transmissive bases of the second component board to which the flat plate is bonded. According to the configuration, the rays of light entering the flat plate transmit through at least one of the first light transmissive bases of the first component board and the second light transmissive bases of the second component board to which the flat plate is bonded after transmitting through the flat plate adhesive layer. The refractive indexes of the flat plate, the flat plate adhesive layer, the at least one of the first light transmissive bases of the first component board and the second light transmissive bases of the second component board to which the flat plate is bonded may be equal to one another. Therefore, the rays of light transmitting through the above components are less likely to be refracted at interfaces and the directions in which the rays of light travel are less likely to change. According to the configuration, the optical performances of the reflection imaging device are less likely to decrease. Even if the outer plate surface of at least one of the first component board and the second component board is not polished, a sufficiently high level of optical performances is achieved.

(2) The flat plate may include flat plates bonded to the outer plate surface of the first component board and the outer plate surface of the second component board with flat plate adhesive layers of the flat plate adhesive layer. According to the configuration, the rays of light transmitting through the flat plate, the flat plate adhesive layers, the first light transmissive bases of the first component board and the second light transmissive bases of the second component board are further less likely to be refracted at interfaces and the directions in which the rays of light travel are further less likely to change. Therefore, the optical performances of the reflection imaging device is further less likely to decrease. Even if the outer plate surfaces of the first component board and the second component board are not polished, a sufficiently high level of optical performances is achieved.

(3) The flat plate may be bonded to the at least one of the first component board and the second component board with the flat plate adhesive layer. The outer plate surface of another one of the first component board and the second component board to which the flat plate is not bonded may be a polished surface on which polishing is performed. Because the flat plate may be bonded to only one of the first component board and the second component board with the flat plate adhesive layer, the number of the flat plates is reduced in comparison to a configuration that includes the flat plates bonded to both component boards. Because the other one of the first component board and the second component board to which the flat plate is not bonded may be polished, the directions in which the rays of light travel are less likely to irregularly change when transmitting through the outer plate surface. Therefore, the optical performances of the reflection imaging device are further less likely to decrease.

(4) The first component board and the second component board may be bonded together with the board adhesive layer therebetween. The refractive index of the first light transmissive bases and the refractive index of the second light transmissive bases may be equal to each other. The board adhesive layer may be made of material having a refractive index equal to the refractive indexes of the first light transmissive bases and the second light transmissive bases. According to the configuration, the rays of light transmit through the first light transmissive bases while reflected off the first planar reflectors, the board adhesive layer, and second light transmissive bases while reflected off the second planar reflectors. Because the refractive indexes of the first light transmissive bases, the board adhesive layer, and the second light transmissive bases are equal to one another, the rays of light are less likely to be refracted at the interfaces and the directions in which the rays of light travel are less likely to change. Therefore, the optical performances of the reflection imaging device are further less likely to decrease. Even if the inner plate surfaces of the first component board and the second component board are not polished, a sufficiently high level of optical performances is achieved.

(5) The inner plate surfaces of the first component board and the second component board may be polished surfaces on which polishing is performed. Because the inner plate surfaces of the first component board and the second component board that are bonded together with the board adhesive layer may be polished surfaces, the directions in which the rays of light travel are less likely to irregularly change when transmitting through the inner plate surfaces that are polished surfaces. Therefore, the optical performances of the reflection imaging device are further less likely to decrease.

A method of producing a reflection imaging device includes a component board bonding process and a flat plate bonding process. The component board bonding process is for bonding a second component board to a first component board with an inner plate surface of the second component board opposed to an inner plate surface of the first component board. The first component board includes first planar reflectors perpendicular to a plate surface and first light transmissive bases having light transmissivity and extending parallel to the first planar reflectors. The first planar reflectors and the first light transmissive bases are alternately arranged. The second component board includes second planar reflectors perpendicular to the plate surfaces and the first planar reflectors and second light transmissive bases having light transmissivity and extending parallel to the second planar reflectors. The second planar reflectors and the second light transmissive bases are alternately arranged. The flat plate bonding process is for bonding a flat plate in a single plate form to the outer plate surface of at least one of the first component board and the second component board opposed to the flat plate.

According to the method, the first component board and the second component board are bonded together with the inner plate surfaces opposed to each other in the component board bonding process. Furthermore, the flat plate in the single plate form is bonded to at least one of the first component board and the second component board with the flat plate opposed to the other plate surface in the flat plate bonding process. Through the processes, the reflection imaging device is produced. In the produced reflection imaging device, the rays of light from the side on which the object to be projected is placed enter the first component board through the outer plate surface thereof, transmit through the first light transmissive bases while reflected off the first planar reflectors, transmit through the second light transmissive bases while reflected off the second planar reflectors, and exit from the second component board through the outer plate surface thereof. Because the first planar reflectors and the second planar reflectors are arranged perpendicular to each other, the direction in which the rays of light exiting from the outer plate surface of the second component board travel is substantially parallel to the direction in which the ray of light entering the outer plate surface of the first component board travel. Therefore, the three-dimensional image of the object is formed at the position such that the reflection imaging device is between the object and the position at which the three-dimensional image of the object is formed.

The first component board includes the first planar reflectors and the first light transmissive bases that are alternately arranged. The second component board includes the second planar reflectors and the second light transmissive bases that are alternately arranged. Therefore, the plate surfaces of the first component board and the second component board tend to have low smoothness and this may cause a decrease in optical performance. The flat plate in the single plate form is bonded to the outer plate surface of at least one of the first component board and the second component board with the flat plate opposed to the outer plate surface. The rays of light entering the outer plate surface and the rays of light exiting from the outer plate surface transmit through the outer plate surface. Because the flat plate is in the single plate form and the smoothness higher than the smoothness of the first component board and the second component board, the direction in which the transmitting light are less likely to irregularly change. According to the configuration, even if the smoothness of the outer plate surface to which the flat plate is bonded is not high, the optical performances of the reflection imaging device is less likely to decrease. Furthermore, polishing is not required for the outer plate surface to which at least the flat plate is bonded. Therefore, the production cost can be reduced and problems that may be caused by the polishing do not occur. This improves yield.

Preferable embodiments may include the following features.

(1) The flat plate bonding process may include bonding flat plates to the first component board and the second component board, respectively. Because the flat plates are bonded to the first component board and the second component board, respectively, in the flat plate bonding process, even if the outer plate surfaces of the first component board and the second component board are not polished, a sufficiently high level of optical performances is achieved.

(2) The component board bonding process may be performed prior to the flat plate bonding process. By performing the component board bonding process prior to the flat plate bonding process, positioning of the second planar reflectors of the second component board relative to the first planar reflectors of the first component board is more easily and accurately performed.

(3) The method may further include a polishing process for polishing the inner plate surfaces of the first component board and the second component board. The polishing process may be performed between the flat plate bonding process that is performed prior to the component board bonding process and the component board bonding process. Because the inner plate surfaces of the first component board and the second component board are polished in the polishing process, the directions in which the rays of light travel are less likely to irregularly change when transmitting through the inner plate surfaces. Therefore, the optical performances of the reflection imaging device are further less likely to decrease. Furthermore, the flat plates are bonded to the outer plate surfaces of the first component board and the second component board polished in the polishing process and the first component board and the second component board are enhanced by the flat plates. Therefore, removal of the first light transmissive bases and the second light transmissive bases due to forces that may be applied to the first component board and the second component board during the polishing is less likely to occur.

(4) The method may further include a polishing process for polishing the outer plate surface of another one of the first component board and the second component board to which the flat plate is not bonded after the flat plate bonding process and the component board bonding process. The flat plate bonding process may include bonding the flat plate to at least one of the first component board and the second component board. Because the flat plate is bonded to only one of the first component board and the second component board in the flat plate bonding process, the number of the flat plates is reduced in comparison to the configuration in which the flat plates are bonded to both component boards. Regarding the other one of the first component board and the second component board to which the flat plate is not bonded, the optical performances thereof are less likely to decrease because the outer plate surface thereof is polished in the polishing process. Furthermore, the flat plate surface is bonded to the outer plate surface of one of the first component board and the second component board to which the flat plate is bonded. The first component board and the second component board are enhanced by the flat plate. Therefore, removal of the first light transmissive bases and the second light transmissive bases are less likely to occur due to forces that may be applied to the other one of the first component board and the second component board to which the flat plate is not bonding during the polishing.

Advantageous Effect of the Invention

According to the present invention, the cost can be reduced and the yield can be improved.

BRIEF DESCRIPTION OF THE DRAWINGS

FIG. 2 is a schematic perspective view illustrating a configuration of the reflection imaging device.

FIG. 35 is a cross-sectional view of a reflection imaging device according to a sixth embodiment of the present invention.

MODE FOR CARRYING OUT THE INVENTION

First Embodiment

Figure 3:
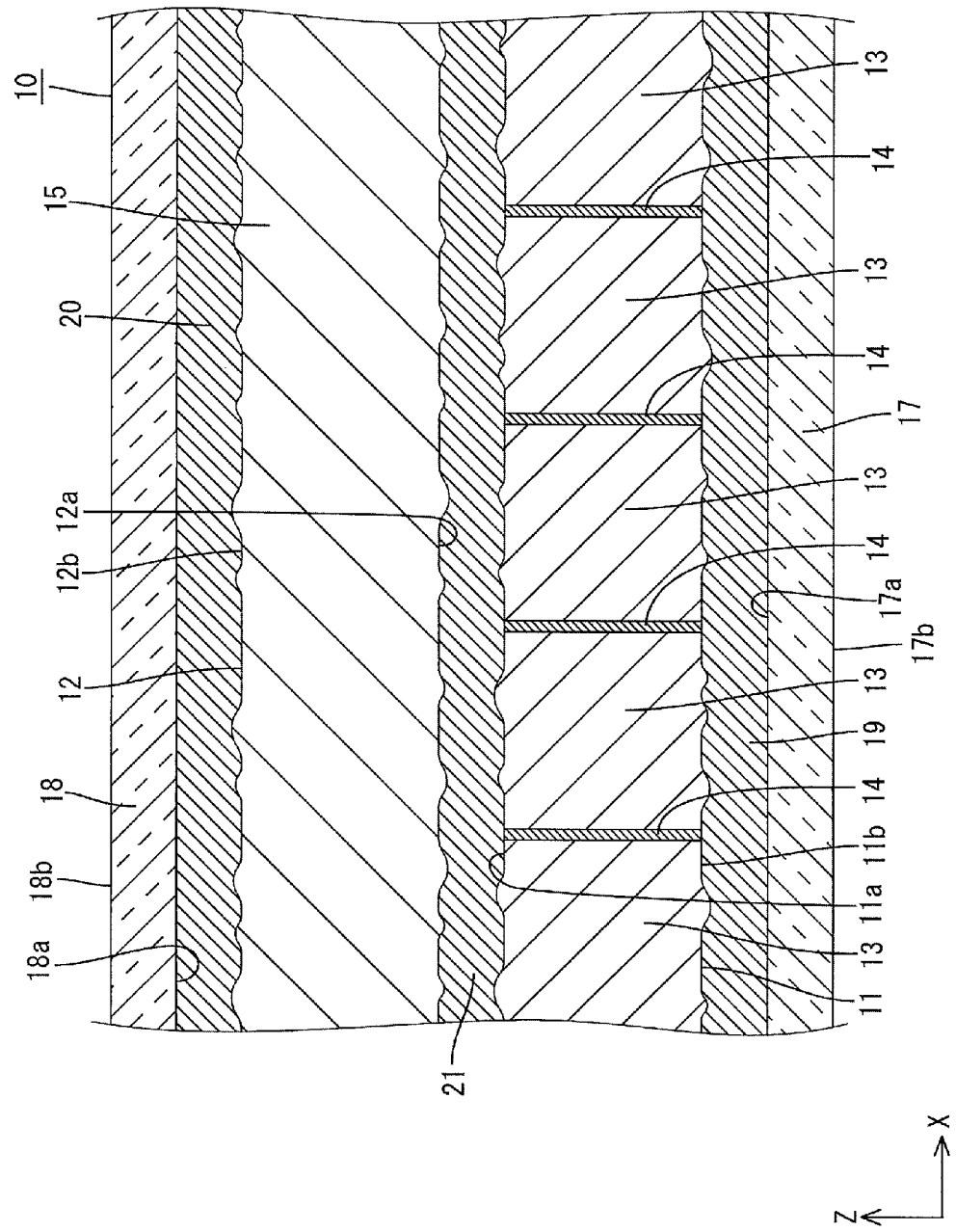
FIG. 3 is a schematic cross-sectional view of the reflection imaging device.

A first embodiment according to the present invention will be described with reference to FIGS. 1 through 17. A reflection imaging device 10 according to this embodiment will be described. X-axis, Y-axis and Z-axis may be indicated in the drawings. The axes in each drawing correspond to the respective axes in other drawings. The vertical direction in FIG. 3 is defined as a reference. The upper side and the lower side in FIG. 3 correspond to the front side and the rear side, respectively.

Figure 1:
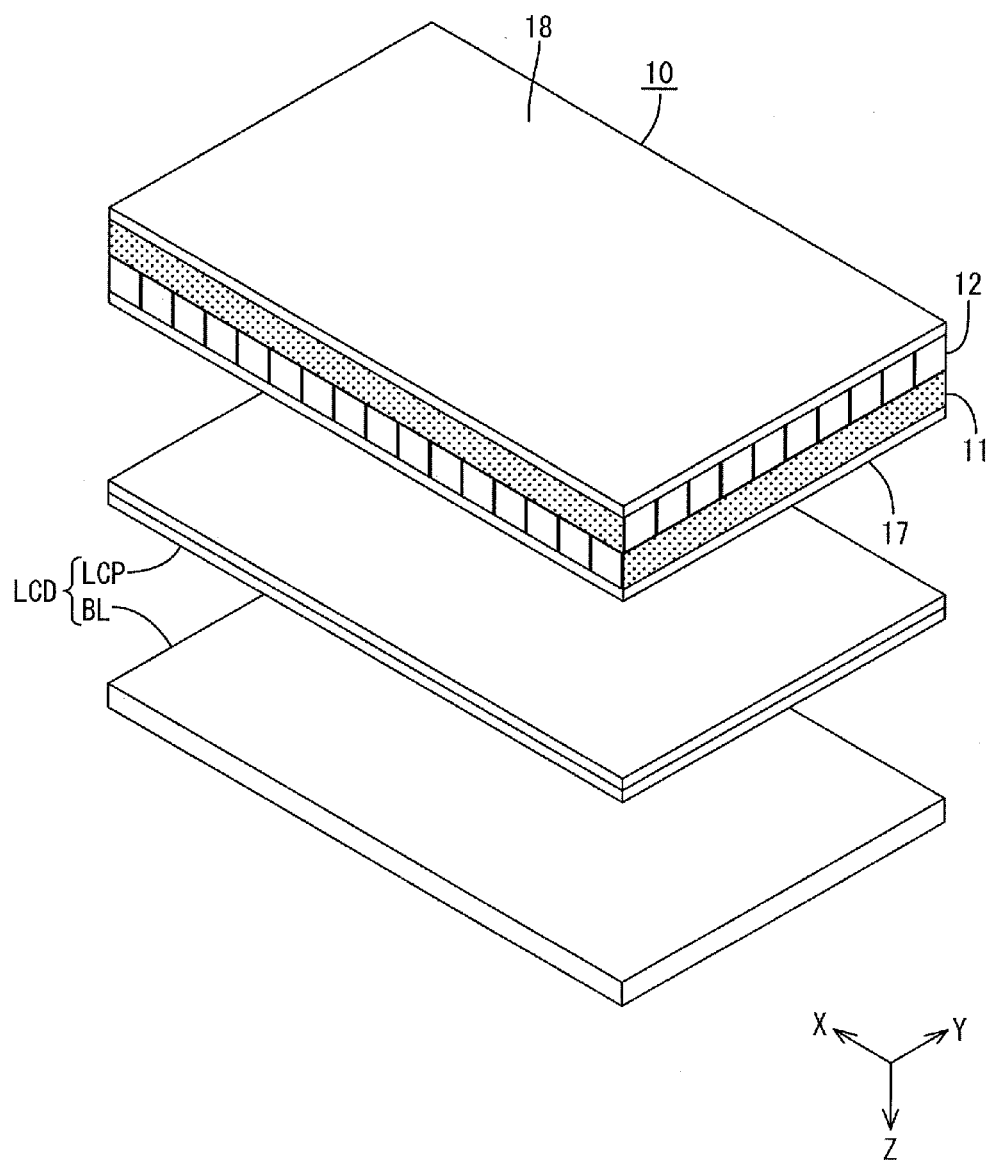
FIG. 1 is a schematic perspective view illustrating configurations of a reflection imaging device and a liquid crystal display according to a first embodiment of the present invention.

As illustrated in FIG. 1, the reflection imaging device 10 according to this embodiment is used in combination with a liquid crystal display LCD disposed behind the reflection imaging device 10. An image displayed on the liquid crystal display LCD is formed (or projected) as a 3-dimensional image that a user sees in front of the reflection imaging device 10 (a side of the reflection imaging device 10 opposite from the liquid crystal display LCD). The liquid crystal display LCD includes a liquid crystal panel LCP and a backlight unit BL. The liquid crystal panel LCP includes a display surface for displaying images. The backlight unit BL is disposed behind the liquid crystal panel LCP (on the side opposite from the reflection imaging device 10) for supplying light to the liquid crystal panel LCP. The liquid crystal panel LCP and the backlight unit BL are held together with a holding member that is not illustrated. The liquid crystal panel LCP includes a pair of boards each having a horizontally-long rectangular shape in a plan view and a liquid crystal layer between the boards. The board on the front is a CF board (a common board) including a light-blocking layer formed in a grid (a black matrix) for separating color filer and portions between color filters from one another. The board on the back is an array board (an active matrix board) including a number of TFTs and a number of pixel electrodes disposed in a matrix. The TFTs are switching components. The pixel electrodes are charged by the TFTs. The array board further includes a number of gate lines and a number of source lines routed in a grid and connected to the TFTs, respectively. The backlight unit BL includes LEDs, a light guide plate, and an optical sheet held in a chassis. The LEDs are light sources. The light guide plate and the optical sheet are optical members. The chassis has an opening on the front side. According to the configuration, the liquid crystal panel LCP is illuminated with light. The configurations of the liquid crystal panel LCP and the backlight unit BL are known configurations and thus they will not be described in detail or not be illustrated in the drawings.

The configuration of the reflection imaging device 10 will be described in detail. As illustrated in FIG. 2, the reflection imaging device 10 is a panel member having a horizontally-long rectangular overall shape in a plan view similar to the liquid crystal panel LCP. The reflection imaging device 10 includes a first component board 11 and a second component board 12 that is layered on the first component board on the front side. Each of the first component board 11 and the second component board 12 has a horizontally-long rectangular shape in a plan view. The first component board 11 and the second component board 12 are bonded together with inner plate surfaces 11a and 12a opposed to each other. The first component board 11 is disposed closer to the liquid crystal display LCD that is a source of 3-dimensional images (an object). The first component board 11 is a "light entrance-side component board" into which light from the liquid crystal display LCD enters. The second component board 12 is disposed farther from the liquid crystal display LCD, that is, on the side on which 3-dimensional images are projected (or formed). The second component board 12 is a "light exit-side component board" from which the light that enters into the first component board 11 exits toward the side on which the images are projected (or formed). Next, the configurations of the first component board 11 and the second component board 12 will be described in detail. In FIGS. 1 and 2, portions of first planar reflectors 14 and second planar light reflectors 16 are illustrated with hatching.

As illustrated in FIG. 2, the first component board 11 includes first light transmissive bases 13 and the first planar reflectors 14 that are alternately arranged along a long-side direction of the reflection imaging device 10 (a second direction along the plate surface, the X-axis direction). The first light transmissive bases 13 extend along a short-side direction of the reflection imaging device 10 (a first direction along the plate surface, the Y-axis direction). Each first planar reflector 14 is disposed on a surface of the corresponding first light transmissive base 13 and extends along the short-side direction of the reflection imaging device 10. The first light transmissive bases 13 are made of glass having high light transmissivity or synthetic resin having high light transmissivity (e.g., PMMA or other acrylic resins). The refractive index of each first light transmissive base 13 is in a range from 1.51 to 1.52. Each first light transmissive base 13 has an elongated rectangular column-like shape (a rectangular parallelepiped shape) which extends along the plate surface of the first component board 11 and the Y-axis direction. The first light transmissive base 13 has a substantially square cross section. As illustrated in FIGS. 2 and 3, the first light transmissive bases 13 are arranged along the X-axis direction. A height of each first light transmissive base 13 along a height direction (the Z-axis direction) is larger than a width thereof along the arrangement direction, that is, a shape is a vertically-long shape. The height may be three times larger than the width. More specifically, the width of each first light transmissive base 13 may be about 0.3 mm and the height thereof may be about 0.9 mm. The first planar reflectors 14 are made of metal (e.g., silver, tin, aluminum) having high light reflectivity at a surface. Each first planar reflector 14 is fixed to a surface of the corresponding first light transmissive base 13 by vapor deposition or other method. Rays of light that hit the surfaces of the first planar reflectors 14 are specularly reflected by the first planar reflectors 14 and the direction of the reflected rays of light is constant. Each first planar reflector 14 is disposed on a peripheral surface of the corresponding first light transmissive base 13 along the Y-axis direction, which is an extending direction thereof, and the Z-axis direction, which is perpendicular to the plate surface of the first component board 11. The first planar reflector 14 has a surface parallel to the Y-Z plane. The first planar reflectors 14 are disposed at intervals along the X-axis direction such that each first planar reflector 14 is between the adjacent first light transmissive bases 13. The interval is about equal to the width of the first light transmissive base 13. Each first light transmissive base 13 is disposed between the adjacent first planar reflectors along the X-axis direction.

As illustrated in FIG. 2, the second component board 12 includes second light transmissive bases 15 and second planar reflectors 16. The second light transmissive bases 15 extend along the long-side direction of the reflection imaging device (the second direction along the plate surface, the X-axis direction). Each second planar reflector 16 is disposed on one of surfaces of the corresponding second light transmissive base 15 and extends along the long-side direction of the reflection imaging device 10. The second light transmissive bases 15 and the second planar reflectors 16 are alternately arranged along the short-side direction of the reflection imaging device 10 (the first direction along the plate surface, the Y-axis direction). The second light transmissive bases 15 are made of glass or synthetic resin (e.g., acrylic resin such as PMMA) which is substantially transparent and has high light transmissivity. The material of the second light transmissive bases 15 is the same material as that of the first light transmissive bases 13. Therefore, the first light transmissive bases 13 have a refractive index about equal to the refractive index of the first light transmissive bases 13. Each second light transmissive base 15 has an elongated rectangular column-like shape (a rectangular parallelepiped shape) which extends along the plate surface of the second component board 12 and the X-axis direction. The second light transmissive base 15 has a substantially square cross section. The extending direction of the second light transmissive bases 15 is perpendicular to the extending direction of the first light transmissive bases 13. As illustrated in FIGS. 2 and 3, the second light transmissive bases 15 are arranged parallel to one another along the Y-axis direction. Each second light transmissive base 15 has an oblong shape with a width along the arrangement direction thereof larger than a height along a height direction (the Z-axis direction). The height may be 3 times larger than the width. The width and the height of each second light transmissive base 15 are about equal to the width and the height of each first light transmissive base 13, respectively. The second planar reflectors 16 are made of metal having high surface light reflectively (e.g., silver, tin, aluminum). Each second planar reflector 16 is fixed to one of the side surfaces of the corresponding second light transmissive base 15 by vapor deposition or other method. The material of the second planar reflectors 16 is the same as the material of the first planar reflectors 14. Rays of light that hit the surfaces of the second planar reflectors 16 are specularly reflected by the second planar reflectors 16 and the direction of the reflected rays of light is constant. Each second planar reflector 16 is disposed on one of peripheral surfaces of the corresponding second light transmissive base 15 along the X-axis direction that corresponds with the extending direction thereof and the Z-axis direction that corresponds with a direction perpendicular to the plate surface of the second component board 12. The second planar reflector 16 forms a surface parallel to the X-Z plane and perpendicular to the first planar reflectors 14. The second planar reflectors 16 are arranged at intervals with respect to the Y-axis direction such that each of the second planar reflectors 16 is between the adjacent second light transmissive bases 15. The interval between the second light transmissive bases 15 is about equal to the width of the second light transmissive bases 15. Namely, the interval between the second planar reflectors 16 is about equal to the interval between the first planar reflectors 14. The second light transmissive bases 15 are arranged such that each second light transmissive base 15 is between the adjacent second planar reflectors 16 that are adjacently arranged with respect to the Y-axis direction. As described above, the second component board 12 has a base configuration similar to that of the first component board 11. The extending direction of the second light transmissive bases 15 and the second planar reflectors 16 is perpendicular to the extending direction of the first light transmissive bases 13 and the first planar reflectors 14.

Figure 4:
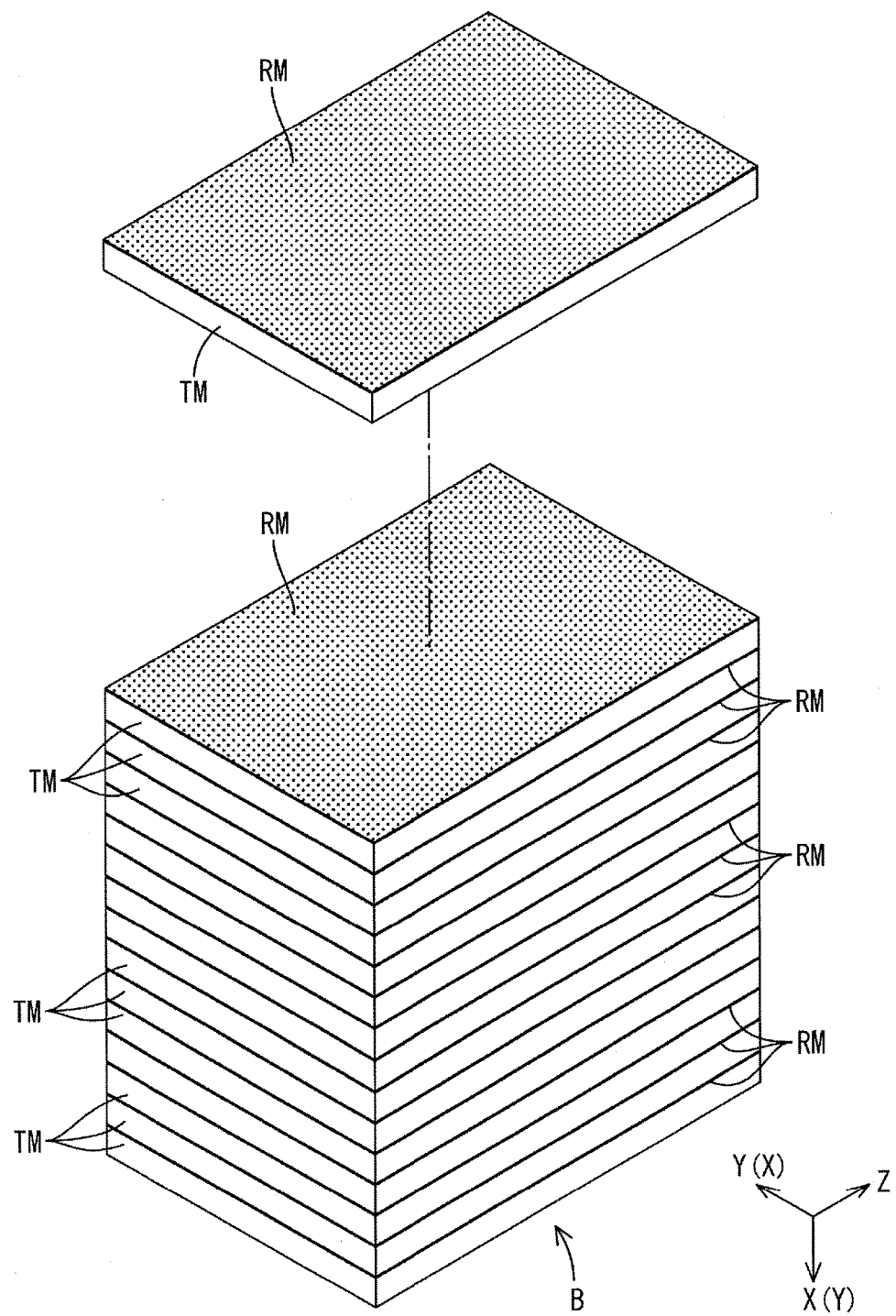
FIG. 4 is a perspective view illustrating a first method of preparing component boards of the reflection imaging device, specifically, a stage of preparation of a base block that is prepared by placing light transmissive bases on which reflector bases are formed in layers.
Figure 5:
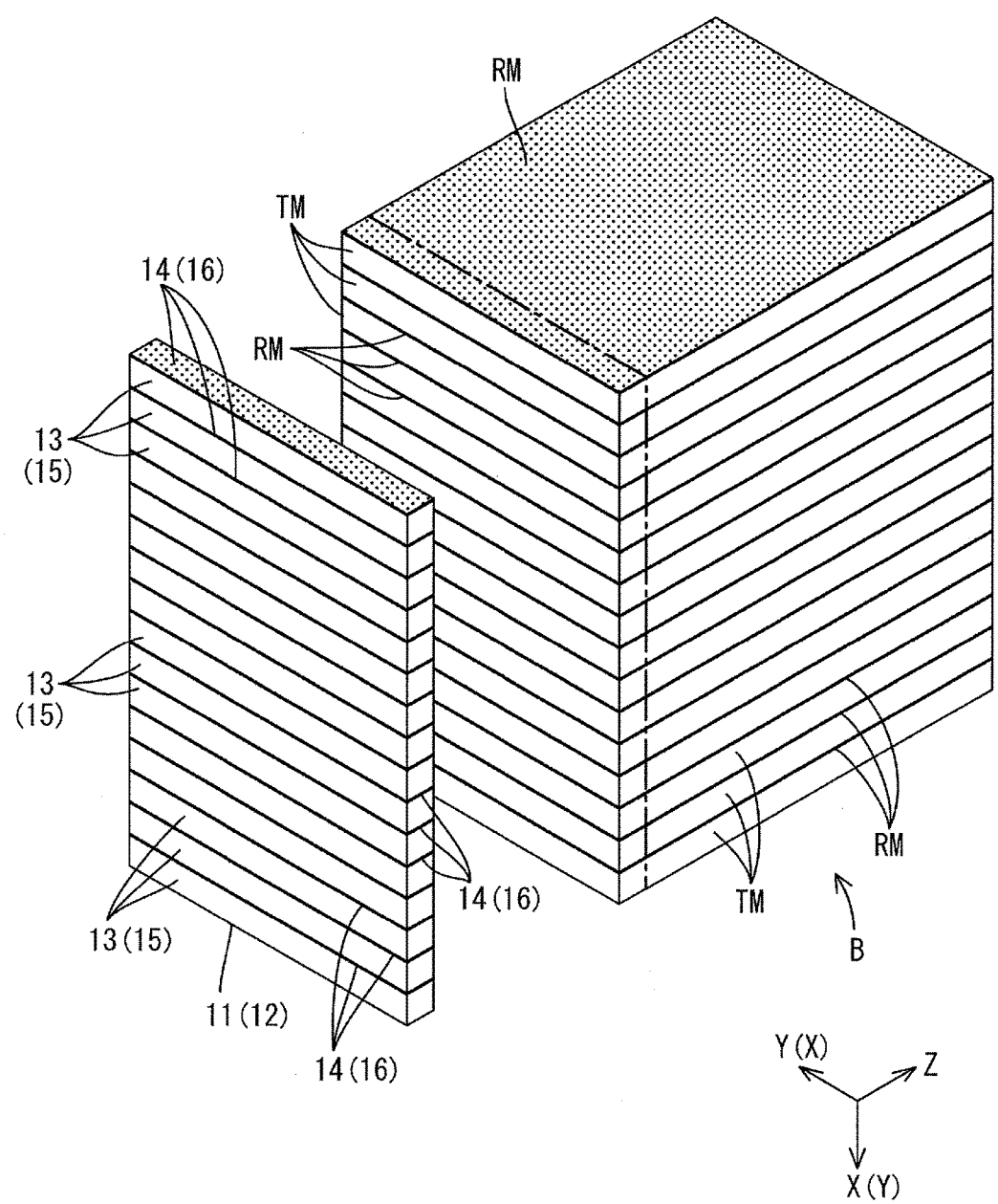
FIG. 5 is a perspective view illustrating a component board cut out of the base block in the first method.
Figure 6:
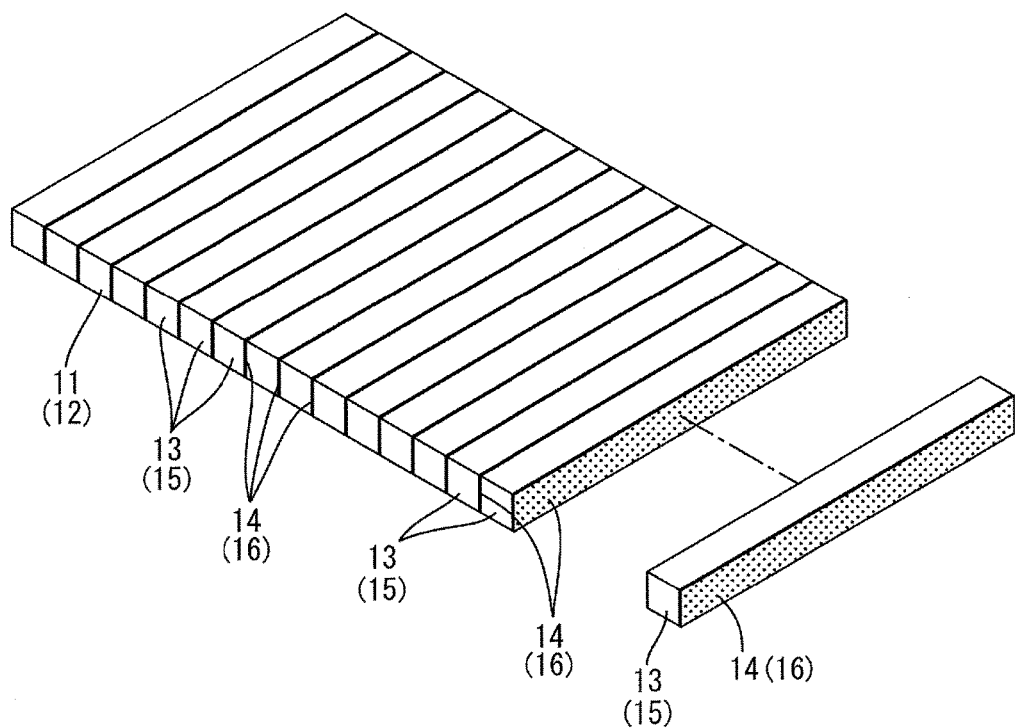
FIG. 6 is a perspective view illustrating a second method of preparing the component boards of the reflection imaging device, specifically, a stage of fixing the light transmissive bases on which the reflector bases are formed together.

As described above, the first component board 11 and the second component board 12 have the configurations similar to each other and thus they can be produced by one of the following methods. A first production method is performed as illustrated in FIG. 4. Light transmissive base boards TM of the light transmissive bases 13 and 15 each having a flat plate-like shape and made of glass or synthetic resin are prepared. Reflector bases RM made of metal of the planar reflectors 14 and 16 are formed on either front plate surfaces or rear plate surfaces of the light transmissive base boards TM by vapor deposition. Next, the light transmissive base boards TM with the reflector bases RM formed thereon are layered such that the light transmissive base boards TM and the reflector bases RM are alternately arranged and fixed to one another with substantially transmissive adhesives that are not illustrated. As a result, a base block B is produced. The base block B is cut along the direction perpendicular to the plate surface of the light transmissive base boards TM. As illustrated in FIG. 5, the first component board 11 and the second component board 12 are prepared. A second production method is illustrated in FIG. 6. The first light transmissive base 13 and the second light transmissive base 15 with the first planar reflectors 14 and the second planar reflectors 16 each formed on one of side surfaces of the respective light transmissive bases 13 and 15 are prepared in advance. The first light transmissive bases 13 are arranged such that the first planer reflectors 14 and the first light transmissive bases 13 are alternately arranged and fixed with substantially transmissive adhesives that are not illustrated. The second light transmissive bases 15 are arranged such that the second planar reflectors 16 and the second light transmissive bases 15 are alternately arranged and fixed with substantially transmissive adhesives that are not illustrated. As a result, the first component board 11 and the second component board 12 are prepared. In FIGS. 4 to 6, some reflector bases, some first planar reflectors 14, and some second planar reflectors 16 are illustrated with hatching.

As described above, the first component board 11 and the second component board 12 are produced by cutting the base block B or fixing the light transmissive bases 13, which are separately prepared, to one another or the light transmissive bases 15, which are separately prepared, to one another. The light transmissive bases 13 are divided by the planar reflectors 14 and the light transmissive bases 15 are divided by the planar reflectors 16. According to the configuration, the smoothness of the plate surface of each of the first component board 11 and the second component board 12 tends to be low and thus the surfaces are more likely to have microscopic asperities. This may reduce the optical performances. To resolve such a problem, the front and the rear plate surfaces of the first component board 11 and the second component board 12 may be polished. To polish the front and the rear plate surfaces of the first component board 11 and the second component board 12, a polishing step needs to be added to a production process and a polishing device needs to be added to production equipment. Furthermore, tact time of the polishing step is long. This may cause a problem that the production cost may be increased. If the first component board 11 and the second component board 12 are polished along the plate surfaces thereof, respectively, forces applied during the polishing may affect the planar reflectors 14 and 16 of the light transmissive bases 13 and 15 to remove the planar reflectors 14 and 16 from the light transmissive bases 13 and 15. This is because the direction of polishing corresponds with the arrangement direction of the light transmissive bases 13 and the planar reflectors 14 or the light transmissive bases 15 and the planar reflectors 16. Therefore, the first component board 11 and the second component board 12 may be damaged and yield may decrease.

As illustrated in FIGS. 2 and 3, flat plates 17 and 18 are bonded to outer plate surfaces (opposite plate surfaces) 11b and 12b opposite from inner plate surfaces (opposite plate surfaces) such that the flat plates 17 and 18 are opposed to each other. One of the flat plates 17 and 18 bonded to the first component board 11 may be referred to as a first flat plate (a flat plate) 17 and the other one of the second component board 12 bonded to the second component board 12 may be referred to as a second flat plate (a flap plate). Each of the flat plates 17 and 18 is a single plate having a horizontally-long rectangular shape in a plan view. Inner plate surfaces 17a and 18a of the flat plates 17 and 18 are opposed to the outer plate surfaces 11b and 12b of the component boards 11 and 12, respectively. The inner plate surfaces 17a and 18a are bonded to the respective outer plate surfaces 11b and 12b with flat plate adhesive layers 19 and 20, respectively, which will be described later. The flat plates 17 and 18 are made of substantially transparent glass or synthetic resin (acrylic resin such as PMMA) having high light transmissivity. Refractive indexes of the flat plates 17 and 18 are about equal to the refractive indexes of the light transmissive boards 13 and 15. Preferably, the flat plates 17 and 18 may be made of the same material as that of the light transmissive bases 13 and 15. According to the configuration, physical values other than the refractive indexes including thermal expansion rates of the flat plates 17 and 18 are equal to physical values of the light transmissive boards 13 and 15.

The component boards 11 and 12 have the configurations including the light transmissive bases 13 and 15 divided by the flat reflectors 14 and 16, respectively, with respect to the direction along the plate surfaces. However, as illustrated in FIGS. 2 and 3, the flat plates 17 and 18 have the seamless single plate configurations without seams with respect to the direction along the plate surfaces. The smoothness of the flat surface of each of the flat plates 17 and 18 is higher than that of the plate surface of each of the component boards 11 and 12. More specifically, the smoothness of the plate surface of each of the flat plates 17 and 18 are equal to the smoothness of the polished plate surfaces of the component boards 11 and 12 or higher. The flat plates 17 and 18 are disposed such that the component boards 11 and 12 that are bonded together are sandwiched between the flat plates 17 and 18. The outer plate surfaces 17b and 18b form the outermost plate surfaces of the reflection imaging device 10. In comparison to a configuration in which the outer plate surface 11b and 12b of the component boards 11 and 12 are configured as the outermost plate surfaces and rays of light directly enter the outer plate surfaces 11b and 12b or exit from the outer plate surfaces 11b and 12b directly to the outside, the direction in which the rays of light travel is less likely to irregularly change at interfaces when the rays of light enter the outer plate surfaces 17b and 18b of the flat plate 17 and 18 or exit from the outer plate surfaces 17b and 18b. Therefore, even if the smoothness of the outer plate surface 11b of the first component board 11 and that of the outer plate surface 12b of the second component board 12 are not high, the optical performances of the reflection imaging device 10 are less likely to decrease. In this embodiment, the inner and the outer (the front and the rear surfaces) plate surfaces 11a, 11b, 12a and 12b of the component boards 11 and 12 are not polished. According to the configuration, it is not necessary to include the polishing step in the production process or the polishing device in the production equipment. This configuration is advantageous for reducing the production cost. Furthermore, problems that may occur during the polishing are less likely to occur. Therefore, yield (throughput yield) improves.

As illustrated in FIG. 3, the first flat plate adhesive layer 19 for bonding the first flat plate 17 and the first component board 11 together is between the first flat plate 17 and the first component board 11, and the second flat plate adhesive layer 20 for bonding the second flat plate 18 and the second component board 12 together is between the second flat plate 18 and the second component board 12. The flat plate adhesive layers 19 and 20 are made of ultraviolet curing resin (e.g., acrylic resin such as PMMA) which is one kind of substantially transparent light curing resin having high light transmissivity. Before exposure to ultraviolet rays, the ultraviolet curing resin of each of the flat plate adhesive layers 19 and 20 is in a liquid state, that is, has flowability. When the ultraviolet curing resin is exposed to the ultraviolet rays, it is hardened and changes its state to a solid state. The flat plate adhesive layers 19 and 20 are made of the same ultraviolet curing resin. Refractive indexes of the flat plate adhesive layers 19 and 20 are about equal to those of the flat plates 17 and 18 and the light transmissive bases 13 and 15. According to the configuration, rays of light traveling between the flat plates 17 and 18 and the light transmissive bases 13 and 15 are less likely to be refracted off the interfaces between the flat plate 17 and the flat plate adhesive layer 19 and between the flat plate 18 and the flat plate adhesive layer 20 and the interfaces between the light transmissive base 13 and the flat plate adhesive layer 19 and between the light transmissive base 15 and the flat plate adhesive layer 20. Therefore, the directions in which the rays of light travel are less likely to change and thus the optical performances of the reflection imaging device 10 are less likely to decrease.

As illustrated in FIG. 3, a board adhesive layer 21 for bonding the first component board 11 and the second component board 12 together is between the first component board 11 and the second component board 12. The board adhesive layer 21 is made of ultraviolet curing resin (e.g., acrylic resin such as PMMA) which is one kind of substantially transparent light curing resin having high light transmissivity. Before exposure to ultraviolet rays, the ultraviolet curing resin of the board adhesive layer 21 is in a liquid state, that is, has flowability. When the ultraviolet curing resin is exposed to the ultraviolet rays, it is hardened and changes its state to a solid state. A refractive index of the board adhesive layer 21 is about equal to those of the first light transmissive base 13 and the second light transmissive base 15. Rays of light traveling between the first light transmissive base 13 and the second light transmissive base 15 are less likely to be refracted off the interface between the first light transmissive base 13 and the board adhesive layer 21 and the interface between the second light transmissive base 15 and the board adhesive layer 21. Therefore, the directions in which the rays of light travel are less likely to change and thus the optical performances of the reflection imaging device 10 are less likely to decrease. The board adhesive layer 21 is made of the same ultraviolet curing resin as the flat plat adhesive layers 19 and 20.

Figure 7:
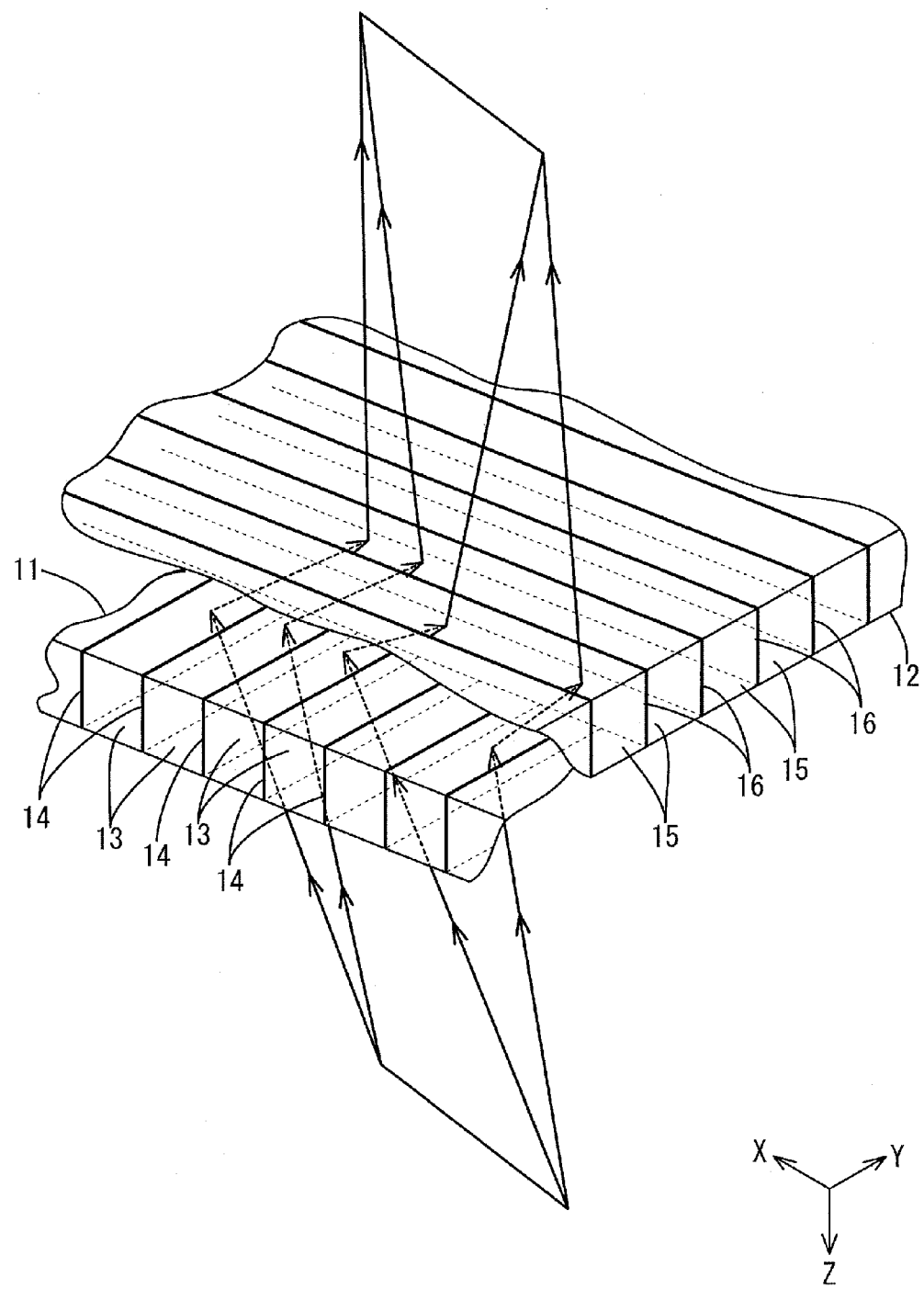
FIG. 7 is a perspective view of a first component board and a second component board for illustrating optical performances of the reflection imaging device.
Figure 8:
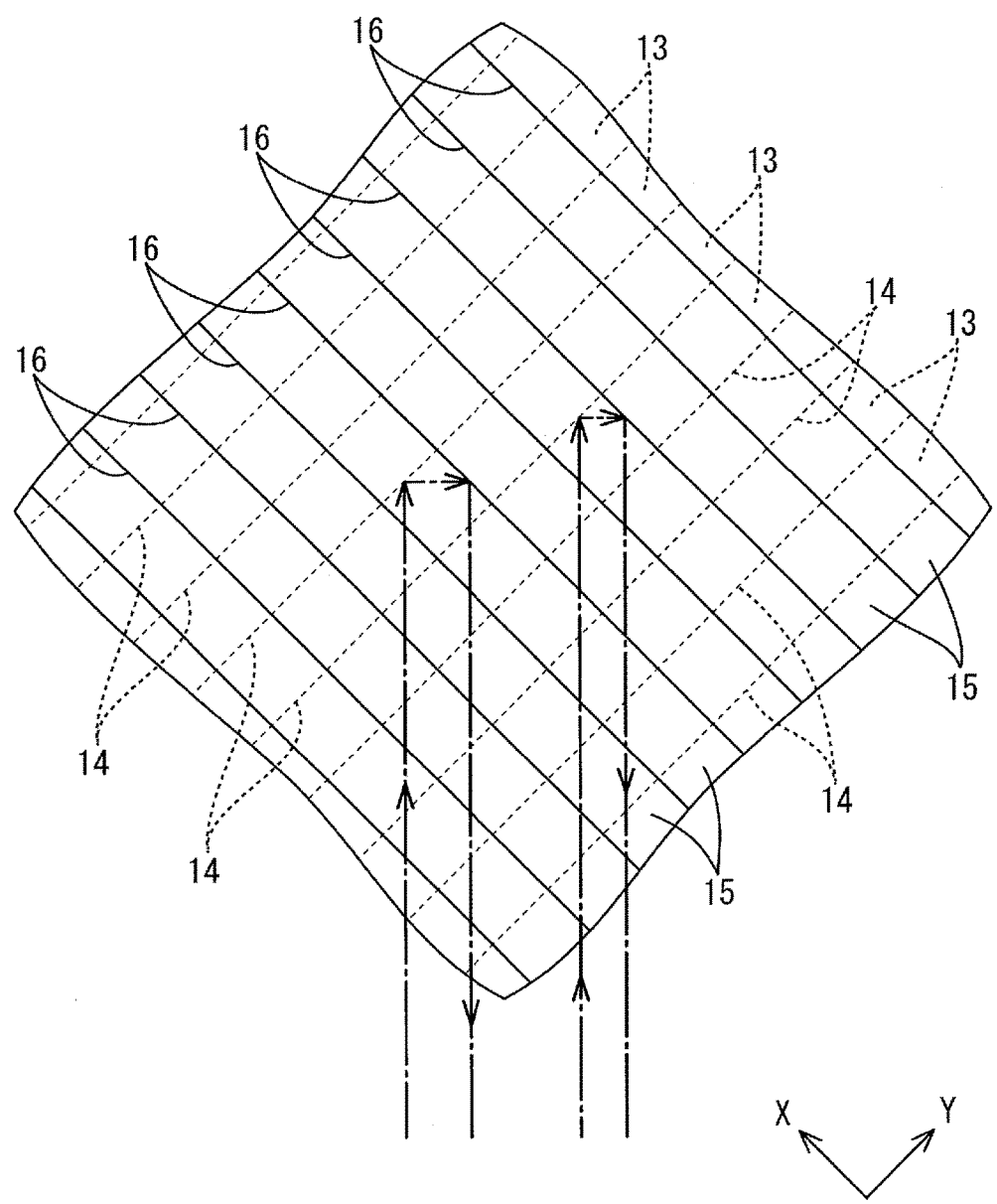
FIG. 8 is a plan view of the first component board and the second component board for illustrating optical performances of the reflection imaging device.
Figure 9:
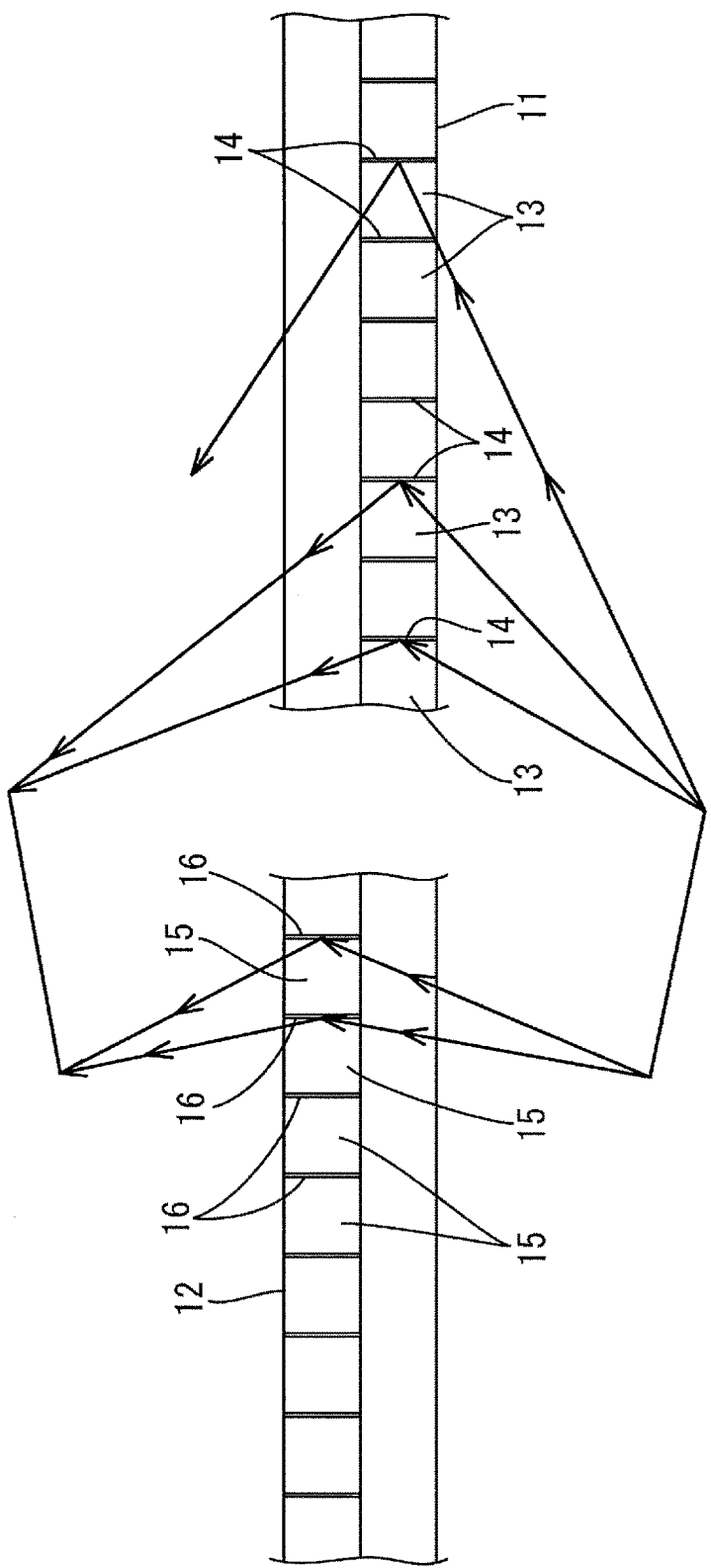
FIG. 9 is a side view of the first component board and the second component board for illustrating optical performances of the reflection imaging device.

Next, the optical performances of the reflection imaging device 10 having the above configuration will be described in detail. When an image is displayed on the display surface of the liquid crystal display device LCD, rays of light used for displaying the image are supplied to the first component board 11 on the rear side of the reflection imaging device (see FIG. 1). As illustrated in FIGS. 7 and 9, the rays of light entering the first light transmissive base 13 in the first component board 11 of the reflection imaging device 10 are specularly reflected by the first planar reflectors 14 disposed on the side surface of the first component board 11. With the first planar reflectors 14, the rays of light are reflected at angles equal to the incident angles. The rays of light reflected off the first planar reflectors 14 enter the second light transmissive bases 15 of the second component board 12 and specularly reflected by the second planar reflectors 16 disposed on the side surface of the second component board 12. With the second planar reflectors 16, the rays of light are reflected at angles equal to the incident angles. As illustrated in FIGS. 8 and 9, the second planar reflectors 16 are perpendicular to the first planar reflectors 14. Therefore, the rays of light reflected off the second planar reflectors 16 travel substantially parallel to the rays of light toward the first planar reflectors 14 in a plan view. When the rays of light reflected off the second planar reflectors 16 exit from the reflection imaging device 10 toward the projection side (the side opposite from the liquid crystal display device LDC), a three-dimensional image is formed at a position symmetric to the liquid crystal display device LCD with the reflection imaging device therebetween. As a result, the use sees the three-dimensional image.

In the reflection imaging device 10 that delivers the above optical performances, the flat plates 17 and 18 are disposed opposite the outer plate surfaces of the component boards 11 and 12 and bonded thereto, respectively. The rays of light from the liquid crystal LCD toward the reflection imaging device 10 enter the first flat plate 17 and the rays of light from the reflection imaging device 10 toward the projection side exit from the second flat plate 18. More specifically, the rays of light from the liquid crystal display device LCD toward the reflection imaging device 10 enter outer plate surface 17b of the first flat plate 17 as illustrated in FIG. 3.

The first flat plate 17 includes the plate surface having the smoothness higher than the first component board 11. Therefore, the rays of light entering the outer plate surface 17c are less likely to be irregularly refracted. The rays of light entering the outer plate surface 17b of the first flat plate 17 are regularly refracted at the interface and transmitted through the first flat plate 17. Then, the rays of light enter the first flat plate adhesive layer 19 that bonds the first flat plate 17 and the first component board 11 together. The first flat plate adhesive layer 19 has the refractive index about equal to that of the first flat plate 17. Therefore, the rays of light entering the first flat plate adhesive layer 19 are less likely to be refracted at the interface between the first flat plate adhesive layer 19 and the first flat plate 17. The rays of light travel about straight and transmit through the first flat plate adhesive layer 19. The rays of light that have transmitted through the first flat plate adhesive layer 19 enter the first light transmissive bases 13 of the first component board 11. Because the refractive indexes of the first flat plate adhesive layer 19 and the first light transmissive bases 13 are about equal, the rays of light are less likely to be refracted at the interface when entering the first light transmissive bases 13 of the first component board 11. The rays of light travel substantially straight through the first light transmissive bases 13 and are specularly reflected by the first planar reflectors 14.

As illustrated in FIG. 3, the rays of light reflected off the first planar reflectors 14 enter the board adhesive layer 21 after transmitting through the first light transmissive bases 13. Because the board adhesive layer 21 has the refractive index about equal to that of the first light transmissive bases 13, the rays of light entering the board adhesive layer 21 are less likely to be refracted at the interface between the board adhesive layer 21 and the first light transmissive bases 13. The rays of light travel substantially straight and transmit through the board adhesive layer 21. The rays of light that have transmitted the board adhesive layer 21 enter the second light transmissive bases 15 of the second component board 12. Because the refractive indexes of the board adhesive layer 21 and the second light transmissive bases 15 are about equal to each other, the rays of light are less likely to be refracted at the interface at the entrance. The rays of light travel substantially straight through the second light transmissive bases 15 and are specularly reflected by the second planar reflectors 16. The rays of light reflected off the second planar reflectors 16 enter the second flat plate adhesive layer 20 for bonding the second flat plate 18 and the second component board 12 together after transmitted through the second light transmissive bases 15. The second flat plate adhesive layer 20 has the refractive index about equal to that of the second light transmissive bases 15. Therefore, the rays of light entering the second flat plate adhesive layer 20 are less likely to be refracted at the interface between the second flat plate adhesive layer 20 and the second light transmissive bases 15. The rays of light travel substantially straight and transmit through the second flat plate adhesive layer 20. The rays of light that have transmitted through the second flat plate adhesive layer 20 enter the second flat plate 18. Because the refractive indexes of the second flat plate adhesive layer 20 and the second flat plate 18 are about equal to each other, the rays of light are less likely to be refracted at the interface at the entrance. The rays of light travel substantially straight through the second flat plate 18. The rays of light that have transmitted the second flat plate 18 exit from the outer plate surface 18b of the second flat plate 18 to the outside (the projection side). The second flat plate 18 includes the plate surface having the smoothness higher than the second component board 12. Therefore, the rays of light entering through the outer plate surface 18b are less likely to be irregularly refracted. The rays of light exiting from the outer plate surface 18b of the second flat plate 18 are regularly refracted at the interface and exit to the outside.

The outer plate surfaces 17b and the 18b of the flat plates 17 and 18 that have the smoothness higher than the component boards 11 and 12 are configured as the light entrance surface and the light exit surface, respectively. Therefore, refraction effects affecting the rays of light entering the reflection imaging device 10 and the ray of light exiting the reflection imaging device 10 produce regular refractions. According to the configuration, high light use efficiency of the rays of light from the reflection imaging device 10 used for formation of three-dimensional images is achieved. Therefore, the user sees clear three-dimensional images, that is, the reflection imaging device 10 achieves high optical performances. Furthermore, the refractive indexes of the light transmissive bases 13 and 15, the flat plates 17 and 18, and the flat plate adhesive layers 19 and 20 of the component boards 11 and 12 and the board adhesive layer 21 are about equal to one another. The rays of light that transmit the above components are less likely to be refracted at the interfaces and thus the directions in which the rays of light reflected by the planar reflectors 14 and 16 are less likely to irregularly change. According to the configuration, a larger number of the rays of light exiting from the reflection imaging device 10 can be used for formation of three-dimensional images. The light use efficiency improves and the reflection imaging device 10 achieves higher optical performances.

Next, a method of producing the reflection imaging device 10 will be described in detail. As illustrated in FIGS. 10 to 17, the reflection imaging device 10 is produced through a first component board preparing step, a second component board preparing step, a component board bonding step, and a flat plate bonding step. The first component board preparing step is for preparing the first component board 11. The second component board preparing step is for preparing the second component board 12. The component board bonding step is for bonding the first component board 11 and the second component board 12 with the inner plate surfaces 11a and 12a opposed to each other. The flat plate bonding step is for bonding the outer plate surface 11b of the first component board 11 and the first flat plate 17 together while opposed to each other and the outer plate surface 12b of the second component board 12 and the second flat plate 18 together while opposed to each other. The first component board preparing step and the second component board preparing step have been described earlier and thus will not be described (see FIGS. 4 to 6).

Figure 10:
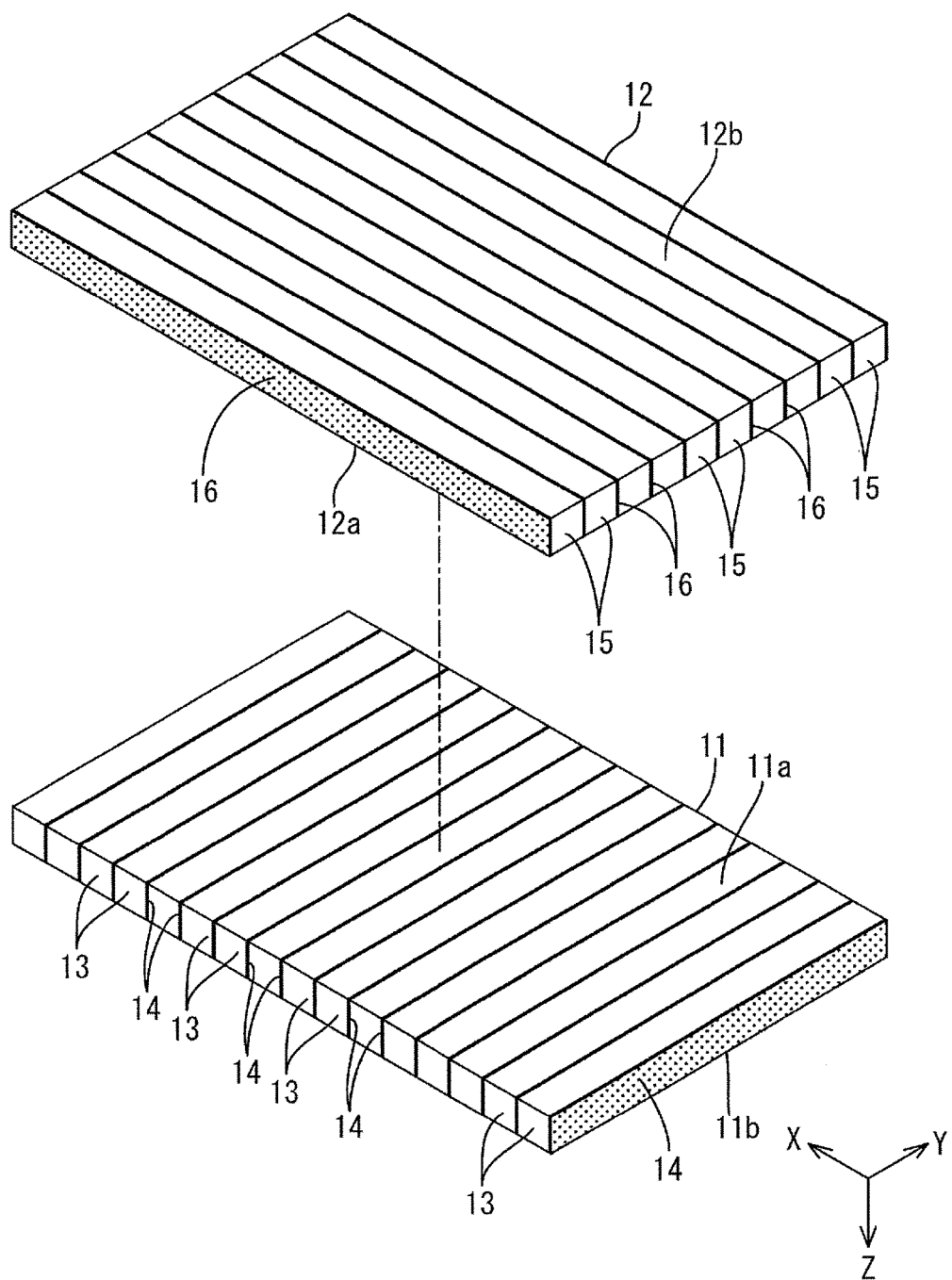
FIG. 10 is a perspective view of the first component board and the second component board before bonded for illustrating a method of producing the reflection imaging device.
Figure 11:
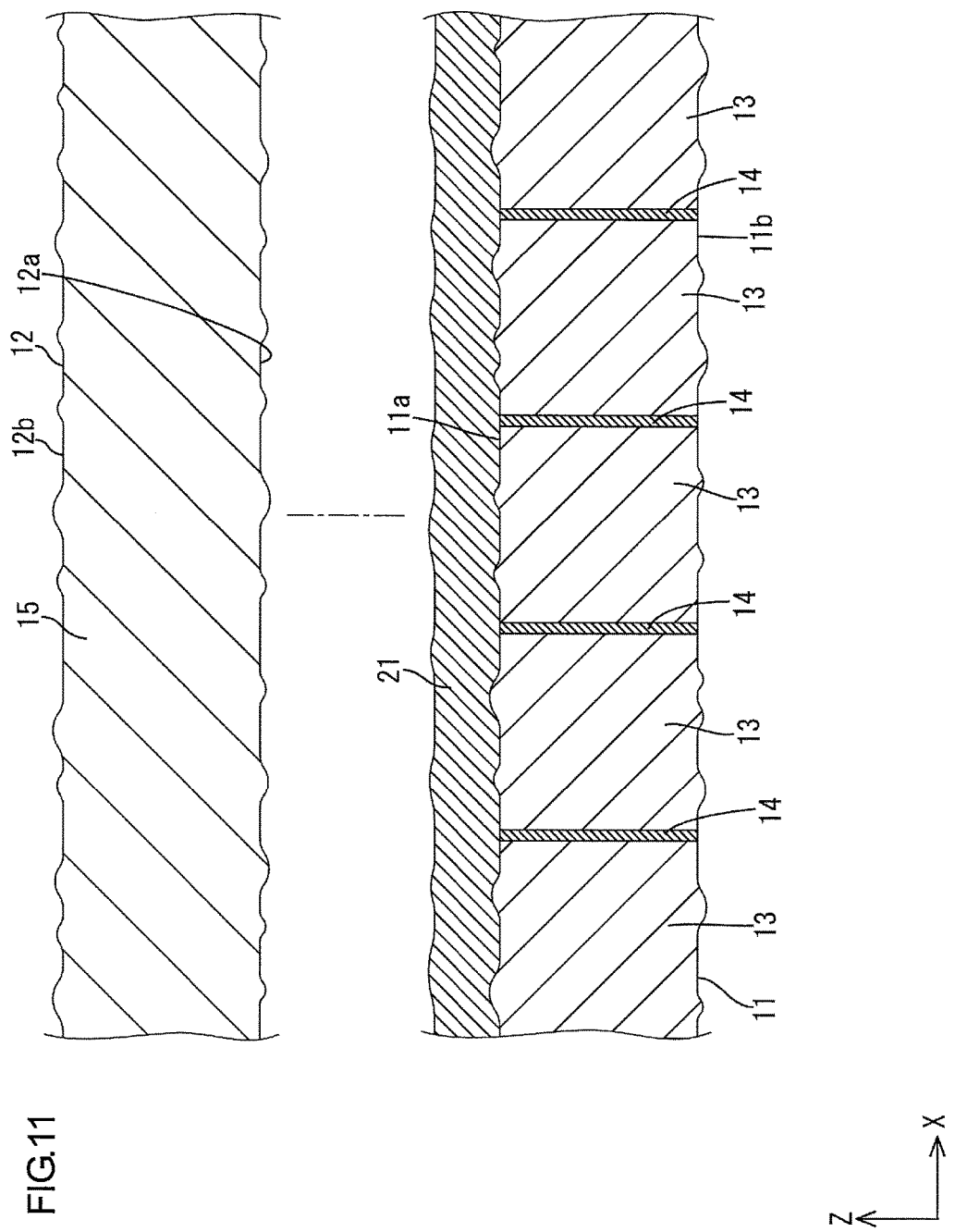
FIG. 11 is a cross-sectional view of the first component board and the second component board before bonded for illustrating the method of producing the reflection imaging device.
Figure 12:
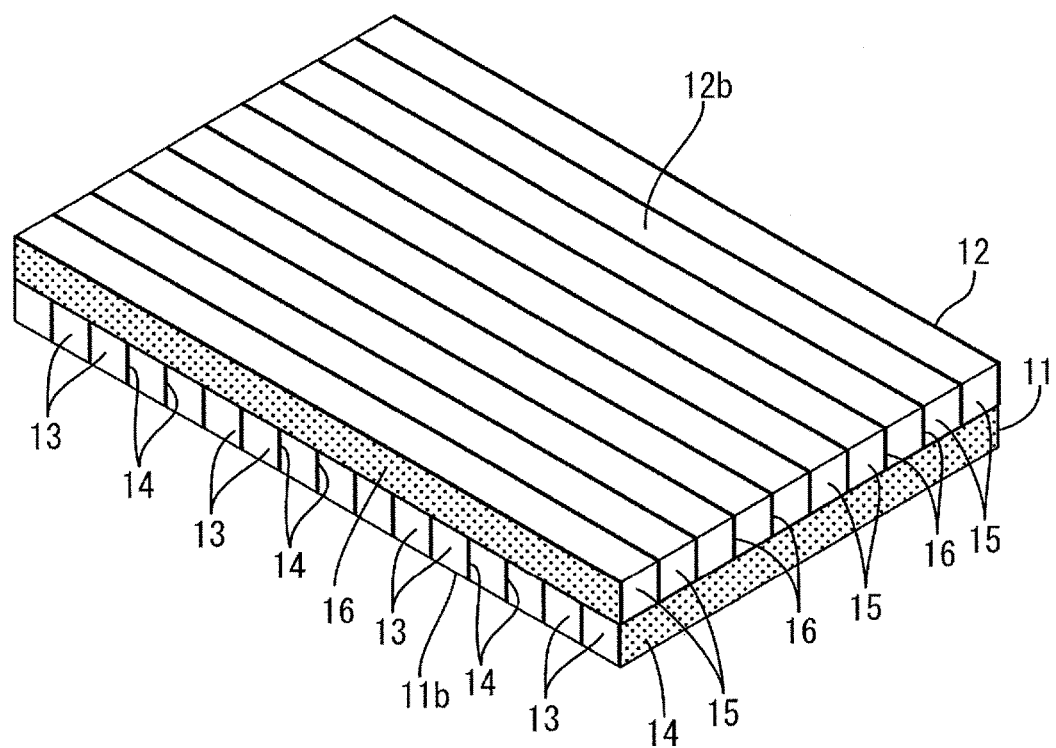
FIG. 12 is a perspective view of the first component board and the second component board bonded together for illustrating the method of producing the reflection imaging device.
Figure 13:
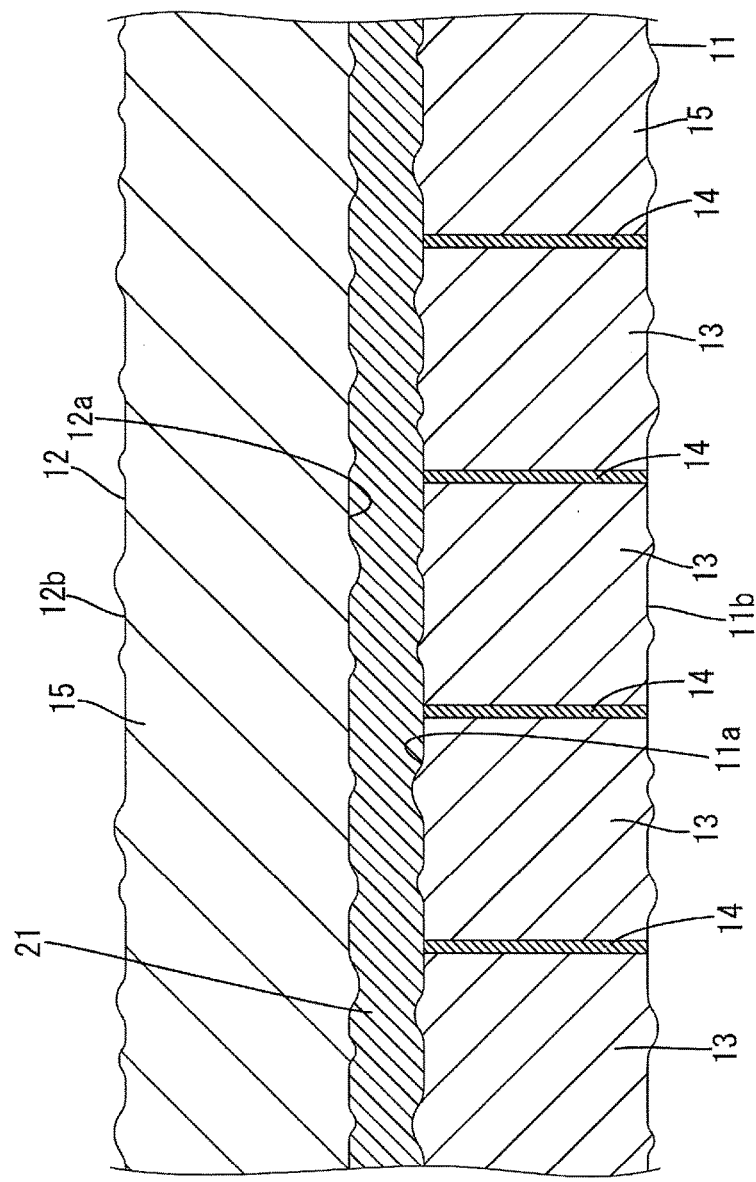
FIG. 13 is a cross-sectional view of the first component board and the second component board bonded together for illustrating the method of producing the reflection imaging device.

The first component board 11 prepared in the first component preparing step and the second component board 12 prepared in the second component preparing step are bonded together in the component board bonding step. As illustrated in FIG. 10, the first component board 11 and the second component board 12 are place in positions such that the extending direction of the first light transmissive bases 13 and the extending direction of the second light transmissive bases 15 are perpendicular to each other and the inner plate surfaces 11a and 12a are opposed to each other and the bonded together. Prior to the bonding, the ultraviolet curing resin of the board adhesive layer 21 in the liquid state is applied to an entire area or a portion of the inner plate surface 11a of the first component board 11 as illustrated in FIG. 11. During the bonding, the ultraviolet curing resin spreads when pressed and is held between the first component board 11 and the second component board 12 as illustrated in FIGS. 12 and 13. The ultraviolet rays are applied to the ultraviolet curing resin of the board adhesive layer 21. The ultraviolet curing resin in the liquid state is hardened and the board adhesive layer 21 is formed. As a result, the first component board 11 and the second component board 12 are tightly fixed. The inner plate surface 11a of the first component board 11 and the inner plate surface 12a of the second component board 12 are not polished in advance to the component board bonding step. The component boards 11 and 12 are bonded together without being polished. Because the method does not include a polishing step for polishing the inner plate surfaces 11a and 12a of the component boards 11 and 12, problems that may be caused by the polishing do not occur in the component boards 11 and 12. Therefore, high yield is achieved.

Figure 14:
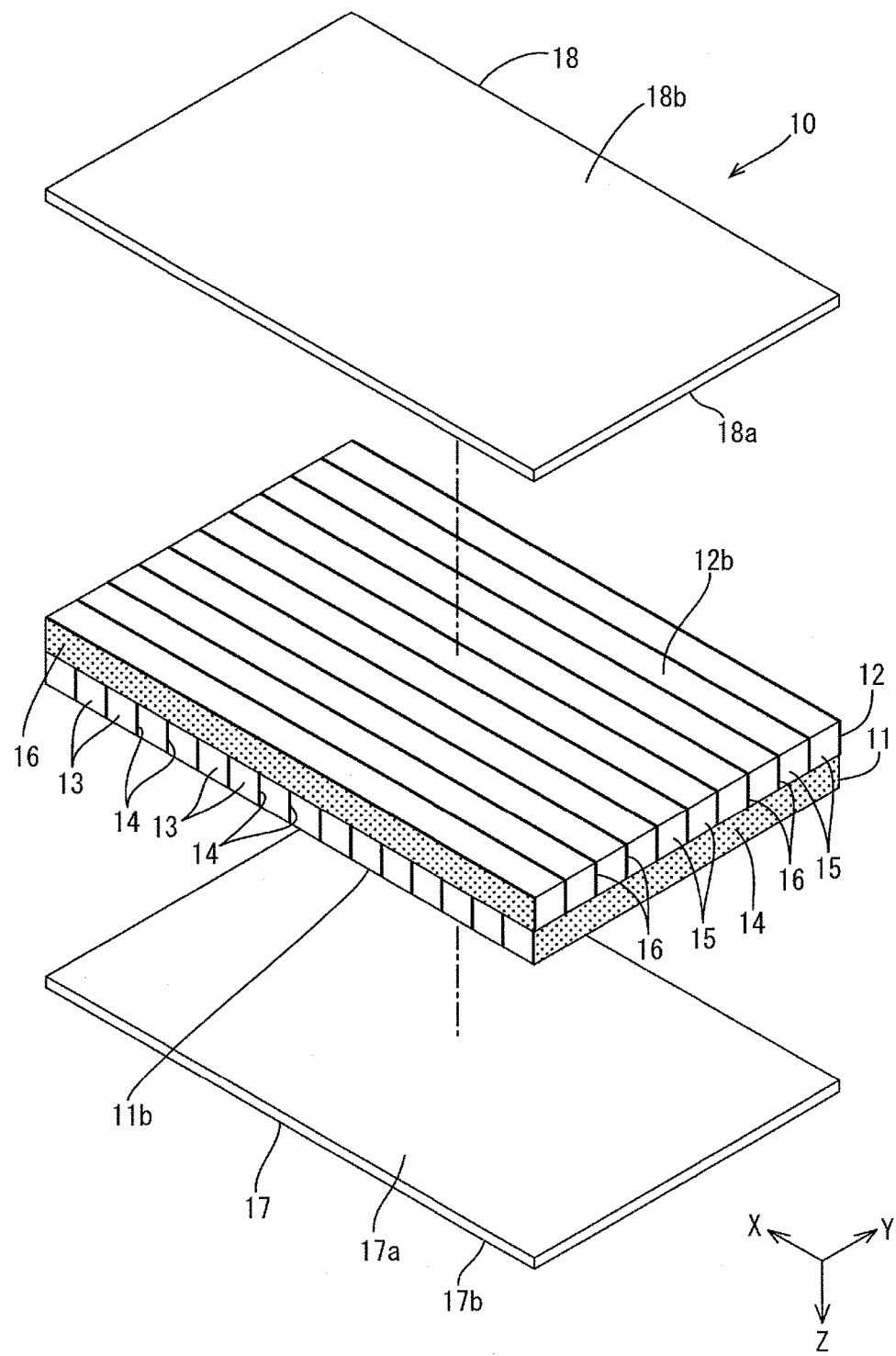
FIG. 14 is a perspective view illustrating the first component board and the second component board bonded together and a first flat plate and a second flat plate before bonded thereto.
Figure 15:
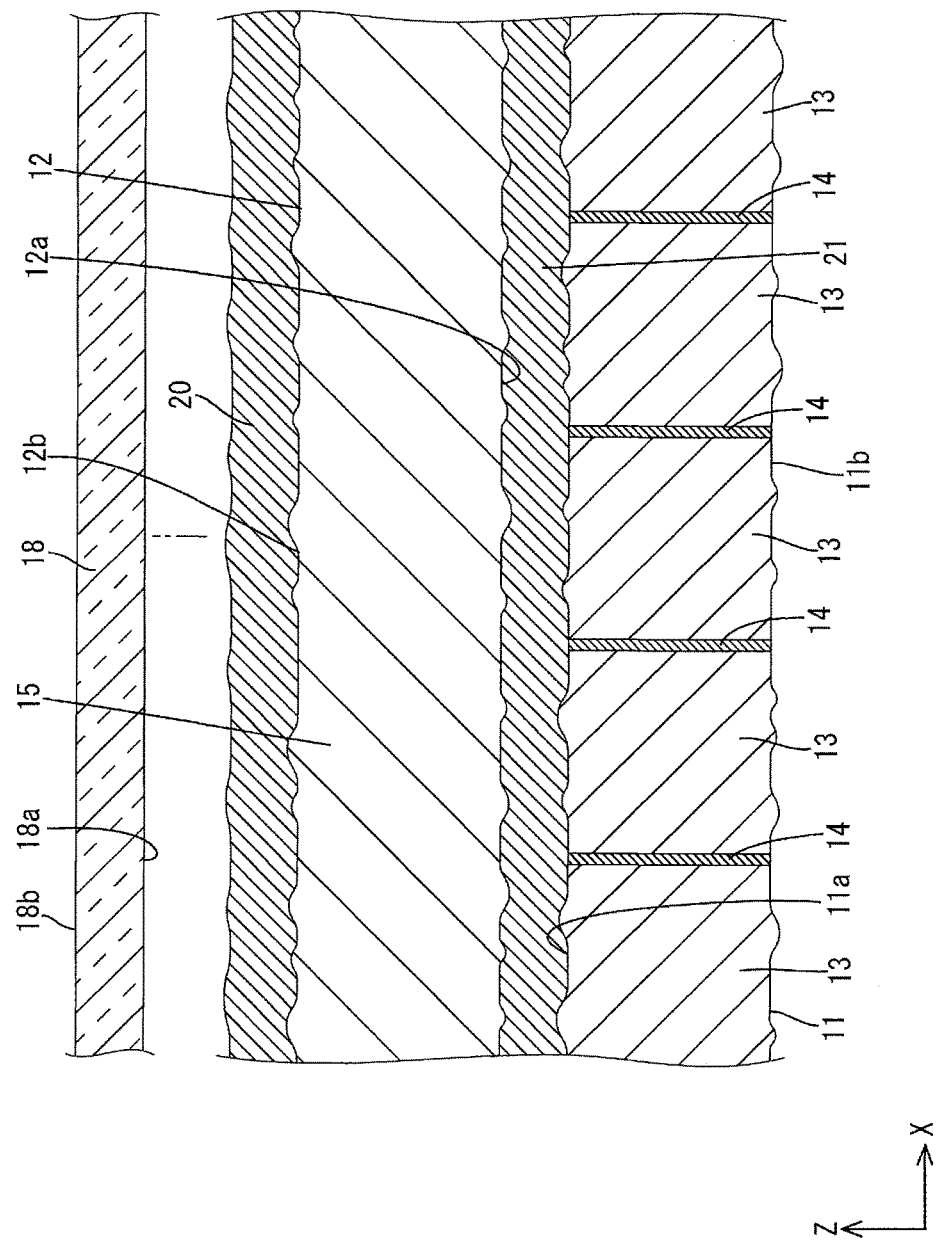
FIG. 15 is a cross-sectional view illustrating the first component board and the second component board bonded together and the first flat plate and the second flat plate before bonded thereto.
Figure 16:
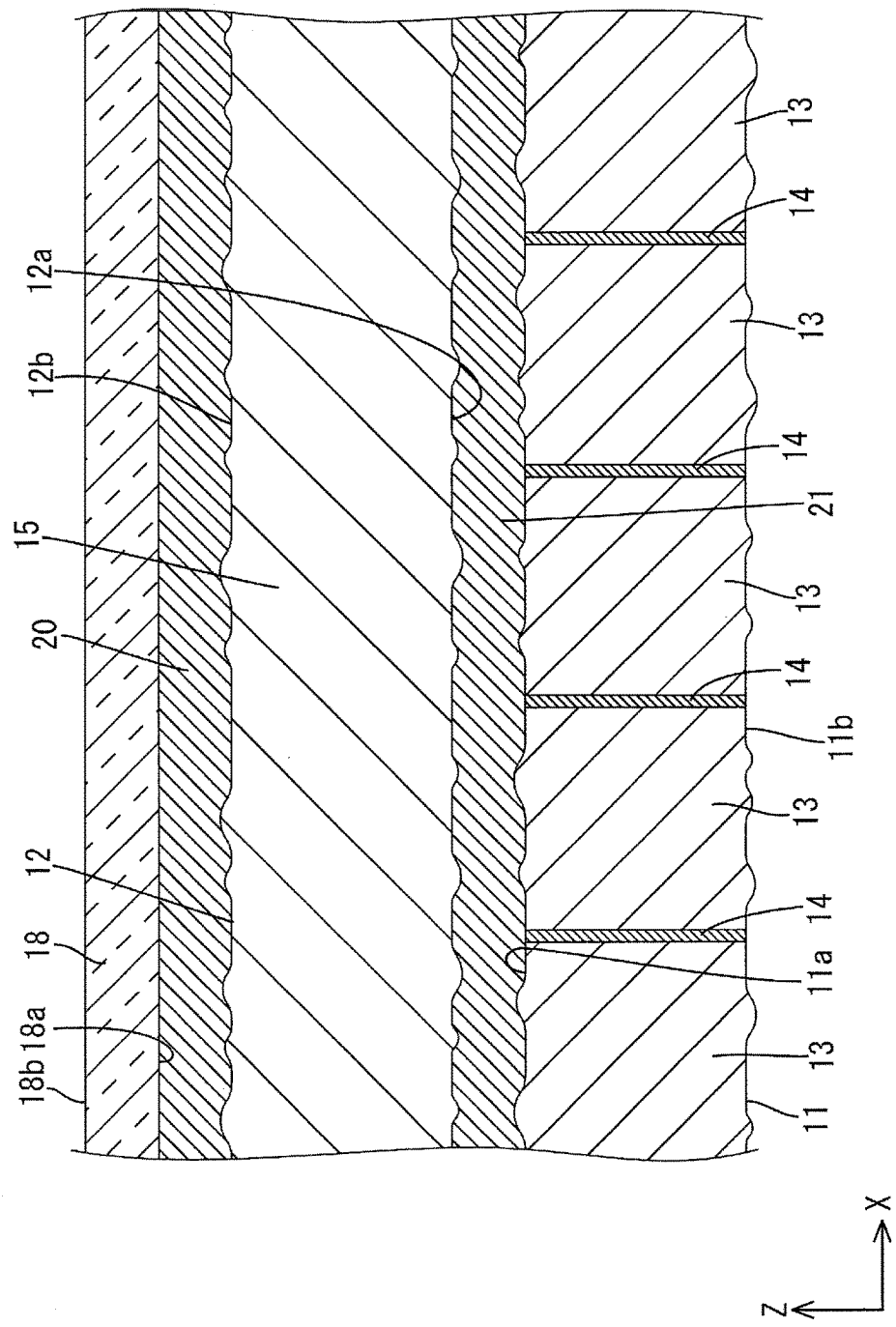
FIG. 16 is a cross-sectional view illustrating the first component board and the second component board bonded together and the first flat plate and the second flat plate bonded thereto.
Figure 17:
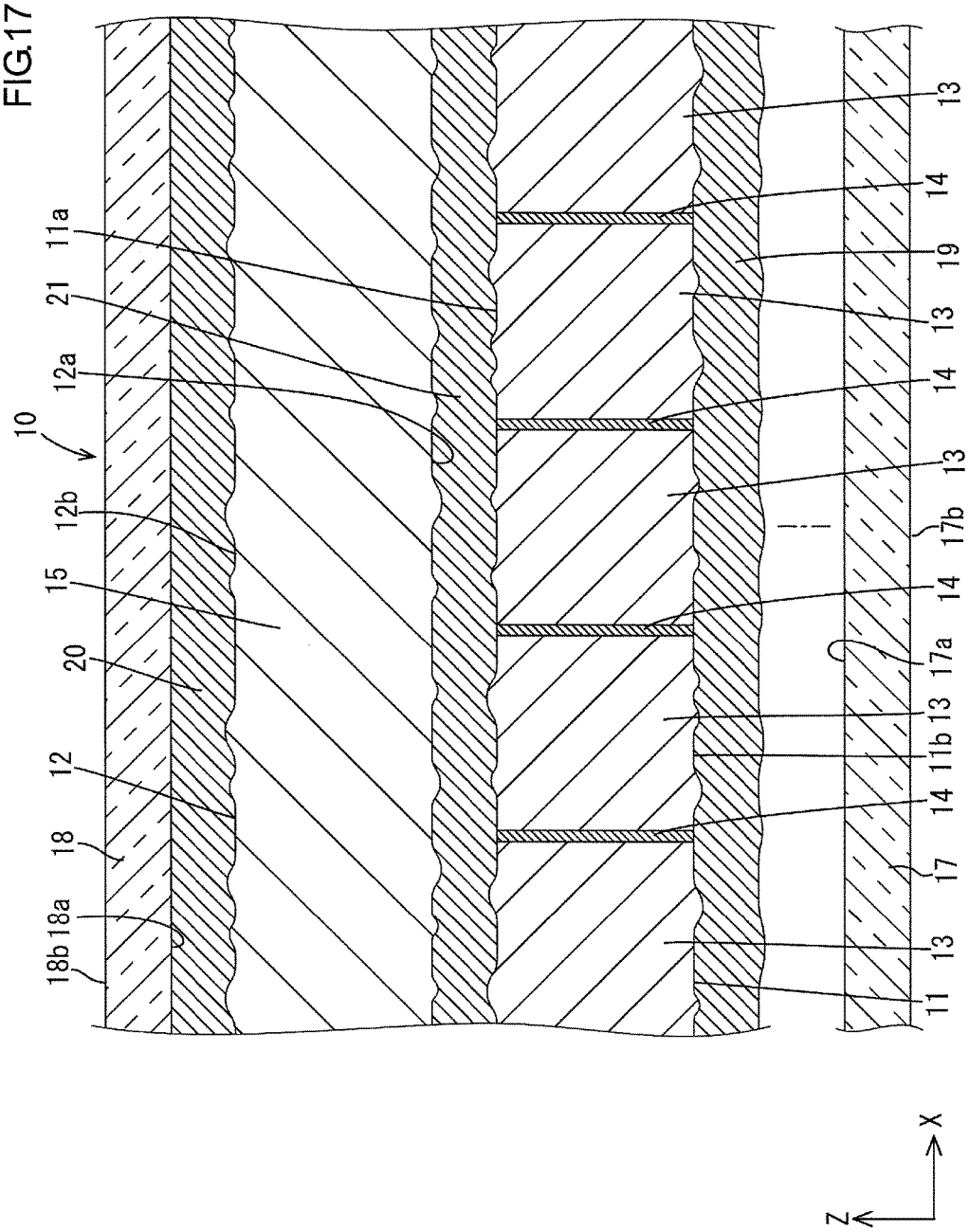
FIG. 17 is a cross-sectional view of the first component board and the second component board bonded together and the second flat plate and the first flat plate before bonded thereto for illustrating the method of producing the reflection imaging device.

The flat plates 17 and 18 are bonded to the first component board 11 and the second component board 12 that are bound together in the component board bonding step in the flat plate bonding step that is performed immediately after the component board bonding step. In the flat plate bonding step, the ultraviolet curing resin of the second flat plate adhesive layer 20 in the liquid state is applied to an entire area or a portion of the outer plate surface 12b of the second component board 12 as illustrated in FIGS. 14 and 15. The second flat plate 18 is bonded to the second component board 12 with the inner plate surface 18a of the second flat plate 18 opposite the outer plate surface 12b of the second component board 12. As illustrated in FIG. 16, the ultraviolet curing resin spreads when pressed and is held between the second flat plate 18 and the second component board 12. The ultraviolet rays are applied to the ultraviolet curing resin of the second flat plate adhesive layer 20. The ultraviolet curing resin in the liquid state is hardened and the second flat adhesive layer 20 is formed. As a result, the second flat plate 18 and the second component board 12 are tightly fixed. As illustrated in FIG. 17, the ultraviolet curing resin of the first flat plate adhesive layer 19 in the liquid state is applied to an entire area or a portion of the outer plate surface 11b of the first component board 11. The first flat plate 17 is bonded to the first component board 11 with the inner plate surface 17a of the first flat plate 17 opposite the outer plate surface 11b of the first component board 11. As illustrated in FIG. 3, the ultraviolet curing resin spreads when pressed and is held between the first flat plate 17 and the first component board 11. The ultraviolet rays are applied to the ultraviolet curing resin of the first flat plate adhesive layer 19. The ultraviolet curing resin in the liquid state is hardened and the first flat plate adhesive layer 19 is formed. As a result, the first flat plate 17 and the first component board 11 are tightly fixed. The outer plate surface 11b of the first component board 11 and the outer plate surface 12b of the second component board 12 are not polished in advance to the flat plate bonding step. The flat plates 17 and 18 are bonded to the component boards 11 and 12 that are not polished. Because the method does not include a polishing step for polishing the outer plate surfaces 11b and 12b of the component boards 11 and 12, problems that may be caused by the polishing do not occur in the component boards 11 and 12. Therefore, high yield is achieved.

As described above, the reflection imaging device 10 according to this embodiment includes the first component board 11, the second component board 12, and the flat plates 17 and 18. The first component board 11 includes the first planar reflectors 14 that are perpendicular to the plate surface and the first light transmissive bases 13 each having the light transmissivity and extending parallel to the first planar reflectors 14. The first planar reflectors 14 and the first light transmissive bases 13 are alternately arranged. The second component board 12 includes the inner plate surface 12a that is opposite the inner plate surface 11a of the first component board 11 and bonded to the inner plate surface 11a of the first component board 11. The second component board 12 includes the second planar reflectors 16 perpendicular to the plate surface and the first planar reflectors 14. The second component board 12 further includes the second light transmissive bases 15 each having the light transmissivity and extending parallel to the second planar reflectors 16. The second planar reflectors 16 and the second light transmissive bases 15 are alternately arranged. Each of the flat plates 17 and 18 is in a single plate form. Each of the flat plates 17 and 18 is opposite the outer plate surface 11b or 12b of at least one of the first component board 11 and the second component board 12 and bonded thereto.

According to the configuration, the rays of light from a side on which an object to be projected is placed enter the outer plate surface 11b of the first component board 11, transmit through the first light transmissive bases 13 while reflected off the first planar reflectors 14, and transmit through the second light transmissive bases 15 while reflected off the second planar reflectors 16. Then, the rays of light exit from the second component board 12 through the outer plate surface 12b. The first planar reflectors 14 and the second planar reflectors 16 are perpendicular to each other. The direction in which the rays of light exiting from the outer plate surface 12b of the second component board 12 travel is substantially parallel to the direction in which the rays of light entering the outer plate surface 11b of the first component board 11 travel. According to the configuration, a three-dimensional image of the object to be projected is formed at a position opposite from the object with the reflection imaging device 10 therebetween.

The first component board 11 includes the first planar reflectors 14 and the first light transmissive bases 13 that are alternately arranged and the second component board 12 includes the second planar reflectors 16 and the second light transmissive bases 15 that are alternately arranged. Therefore, the plate surfaces 11a, 11b, 12a, and 12b tend to have low smoothness. This may reduce the optical performances. Each of the flat plates 17 and 18 is opposed to the outer plate surface 11b or 12b of at least one of the first component board 11 and the second component board 12 and bonded thereto. The rays of light entering the outer plate surfaces 11b and 12b to which the flat plates 17 and 18 each in the single plate form are bonded or the rays of light exiting from the outer plate surfaces 11b and 12b transmit through the flat plates 17 and 18. Each of the flat plates 17 and 18 is in the single plate form and the smoothness higher than the first component board 11 and the second component board 12. Therefore, the directions in which rays of transmitting light travel are less likely to irregularly change. According to the configuration, even if the outer plate surfaces 11b and 12b to which the flat plates 17 and 18 are bonded have low smoothness, the optical performances of the reflection imaging device 10 are less likely to decrease. Furthermore, polishing is not required for improving the smoothness of the outer plate surfaces 11b and 12b to which at least the flat plates 17 and 18 are bonded. Therefore, the production cost can be reduced. Furthermore, problems that may be caused by polishing are less likely to occur and thus the yield may be improved.

The flat plates 17 and 18 and at least one of the first component board 11 and the second component board 12 are bonded with the flat plate adhesive layers 19 and 20 that are formed therebetween. The refractive indexes of the flat plates 17 and 18 and at least one of the first light transmissive bases 13 of the first component board 11 and the second light transmissive bases 15 of the second component board 12 to which the flat plates 17 and 18 are bonded are equal to each other. The flat plate adhesive layers 19 and 20 are made of the material having the refractive index equal to the flat plates 17 and 18 and at least one of the first light transmissive bases 13 of the first component board 11 and the second light transmissive bases 15 of the second component board 12 to which the flat plates 17 and 18 are bonded. According to the configuration, the rays of light entering the flat plates 17 and 18 transmit at least one of the first light transmissive bases 13 of the first component board 11 and the second light transmissive bases 15 of the second component board 12 to which the flat plates 17 and 18 are bonded after transmitting through the flat plate adhesive layers 19 and 20. The refractive indexes of the flat plates 17 and 18, the flat plate adhesive layers 19 and 20, and at least one of the first light transmissive bases 13 of the first component board 11 and the second light transmissive bases 15 of the second component board 12 to which the flat plates 17 and 18 are bonded are equal to one another. Therefore, the rays of light transmitting through the above components are less likely to be refracted at the interfaces and thus the direction in which the rays of light are less likely to change. The optical performances of the reflection imaging device 10 are less likely to decrease. Even if the outer plate surfaces 11b or 12b of at least one of the first component board 11 and the second component board 12 is not polished, the sufficiently high optical performances are achieved.

The flat plates 17 and 18 are bonded to the outer plate surface 11b of the first component board 11 and the outer plate surface 12b of the second component board 12 with the flat plate adhesive layers 19 and 20, respectively. According to the configuration, the rays of light transmitting through the flat plates 17 and 18, the flat plate adhesive layers 19 and 20, the first light transmissive bases 13 of the first component board 11 and the second light transmissive bases of the second component board 12 are further less likely to be refracted at the interfaces and the directions in which the rays of light travel are further less likely to change. Therefore, the optical performances of the reflection imaging device 10 are further less likely to decrease. Even if the outer plate surfaces 11b and 12b of the first component board 11 and the second component board 12 are not polished, a sufficiently high level of optical performances is achieved.

The first component board 11 and the second component board 12 are bonded together with the board adhesive layer 21 that is therebetween. The refractive indexes of the first light transmissive bases 13 and the second light transmissive bases 15 are equal to each other. The board adhesive layer 21 is made of the material having the refractive index equal to the first light transmissive bases 13 and the second light transmissive bases 15. According to the configuration, the rays of light reflected off the first planar reflectors 14 while transmitting through the first light transmissive bases 13 transmit through the board adhesive layer 21 and are reflected off the second planar reflectors 16 while transmitting through the second light transmissive bases 15. The refractive indexes of the first light transmissive bases 13, the board adhesive layer 21, and the second light transmissive bases 15 are equal to one another. The rays of light transmitting through the above components are less likely to be refracted at the interfaces and the directions in which the rays of light travel are less likely to change. Therefore, the optical performances of the reflection imaging device 10 are further less likely to decrease. Even if the inner plate surfaces 11a and 12a of the first component board 11 and the second component board 12 are not polished, a sufficiently high level of optical performances is achieved.

The method of producing the reflection imaging device 10 according to this embodiment includes the component board bonding step, the first flat plate bonding step, and the second flat plate bonding step (a flat plate bonding process). In the component board bonding step, the second component board 12 is bonded to the first component board 11 with the inner plate surface 12a opposite the inner plate surface 11a of the first component board 11. The first component board 11 includes the first planar reflectors 14 perpendicular to the plate surface and the first light transmissive bases 13 each having the light transmissivity and extending parallel to the first planer reflectors 14. The first planar reflectors 14 and the first light transmissive bases 13 are alternately arranged. The second component board 12 includes the second planar reflectors 16 perpendicular to the plate surface and the first planar reflectors 14 and the second light transmissive bases 15 each having the light transmissivity and extending parallel to the second planar reflectors 16. The second planar reflectors 16 and the second light transmissive bases 15 are alternately arranged. In the first flat plate bonding step, the flat plate 17 in the single plate form is bonded to at least one of the outer plate surfaces 11b of the first component board 11 with the flat plate 17 opposite the outer plate surface 11b. In the second flat plate bonding step, the flat plate 18 in the single plate form is bonded to at least one of the outer plate surfaces 12b of the second component board 12 with the flat plate 18 opposite the outer plate surface 12b.

According to the method, the first component board 11 and the second component board 12 are bonded together with the inner plate surfaces 11a and 12a opposed to each other in the component board bonding step. The flat plates 17 and 18 each in the single plate form are bonded to at least one of the first component board 11 and the second component board 12 opposed to the other plate surface in the first flat plate bonding step and the second flat plate bonding step. Through the steps, the reflection imaging device 10 is produced. In the produced reflection imaging device 10, the rays of light from the side on which the object to be projected is located enter the first component board 11 through the outer plate surface 11b. The rays of light transmit through the first light transmissive bases 13 while reflected off the first planar reflectors 14 and then transmit through the second light transmissive bases 15 while reflected off the second planar reflectors 16. Then, the rays of light exit from the second component board 12 through the outer plate surface 12b. The first planar reflectors 14 and the second planar reflectors 16 are perpendicular to each other. Therefore, the directions in which the rays of light exiting the second component board 12 through the outer plate surface 12b travel are substantially parallel to the directions in which the rays of light entering the first component board 11 through the outer plate surface 11b travel. According to the configuration, the three-dimensional image of the object to be projected is formed at the position on the opposite side with respect to the object with the reflection imaging device 10 therebetween.

The first component board 11 includes the first planar reflectors 14 and the first light transmissive bases 13 that are alternately arranged. The second component board 12 includes the second planar reflectors 16 and the second light transmissive bases 15 that are alternately arranged. Therefore, the smoothness of each plate surface tends to be low.

This may reduce the optical performances. The flat plates 17 and 18 each in the single plate form are opposite the outer plate surfaces 11b and 12b of at least one of the first component board 11 and the second component board 12 and bonded. The rays of light entering the outer plate surfaces 11b and 12b to which the flat plates 17 and 18 are bonded or the rays of light exiting from the outer plate surfaces 11b and 12b transmit through the flat plates 17 and 18. Each of the flat plates 17 and 18 is in the single plate form and higher smoothness than the first component board 11 and the second component board 12. Therefore, the directions of rays of transmitting light are less likely to irregularly change. Even if the outer plate surfaces 11b and 12b to which the flat plates 17 and 18 are bonded do not have high smoothness, the optical performances of the reflection imaging device 10 are less likely to decrease. Furthermore, the polishing of the outer plate surfaces 11b and 12b to which at least the flat plates 17 and 18 are bonded is not required to improve the smoothness. Therefore, the production cost can be reduced. Furthermore, problems that may be caused by the polishing are less likely to occur and thus the yield may improve.

In the first flat plate bonding step and the second flat plate bonding step, the flat plates 17 and 18 are bonded to the first component board 11 and the second component board 12, respectively. The flat plates 17 and 18 are bonded to the first component board 11 and the second component board 12, respectively through the first flat plate bonding step and the second flat plate bonding step. Even if the outer plate surfaces 11b and 12b of the first component board 11 and the second component board 12 are not polished, the sufficiently high optical performances are achieved.

The component board bonding step is performed prior to the first flat plate bonding step and the second flat plate bonding step. By performing the component board bonding step prior to the first flat plate bonding step and the second flat plate bonding step, positioning of the first planar reflectors 14 of the first component board 11 and the second planer reflectors 16 is more easily and accurately performed in the component board bonding step.

Second Embodiment

A second embodiment according to the present invention will be described with reference to FIGS. 18 to 24. The second embodiment includes component boards 111 and 112 including plate surfaces 111a and 112a, respectively. The plate surfaces 111a and 112a are inner plate surfaces that are polished. Structures, functions, and effects similar to those of the first embodiment will not be described.

Figure 18:
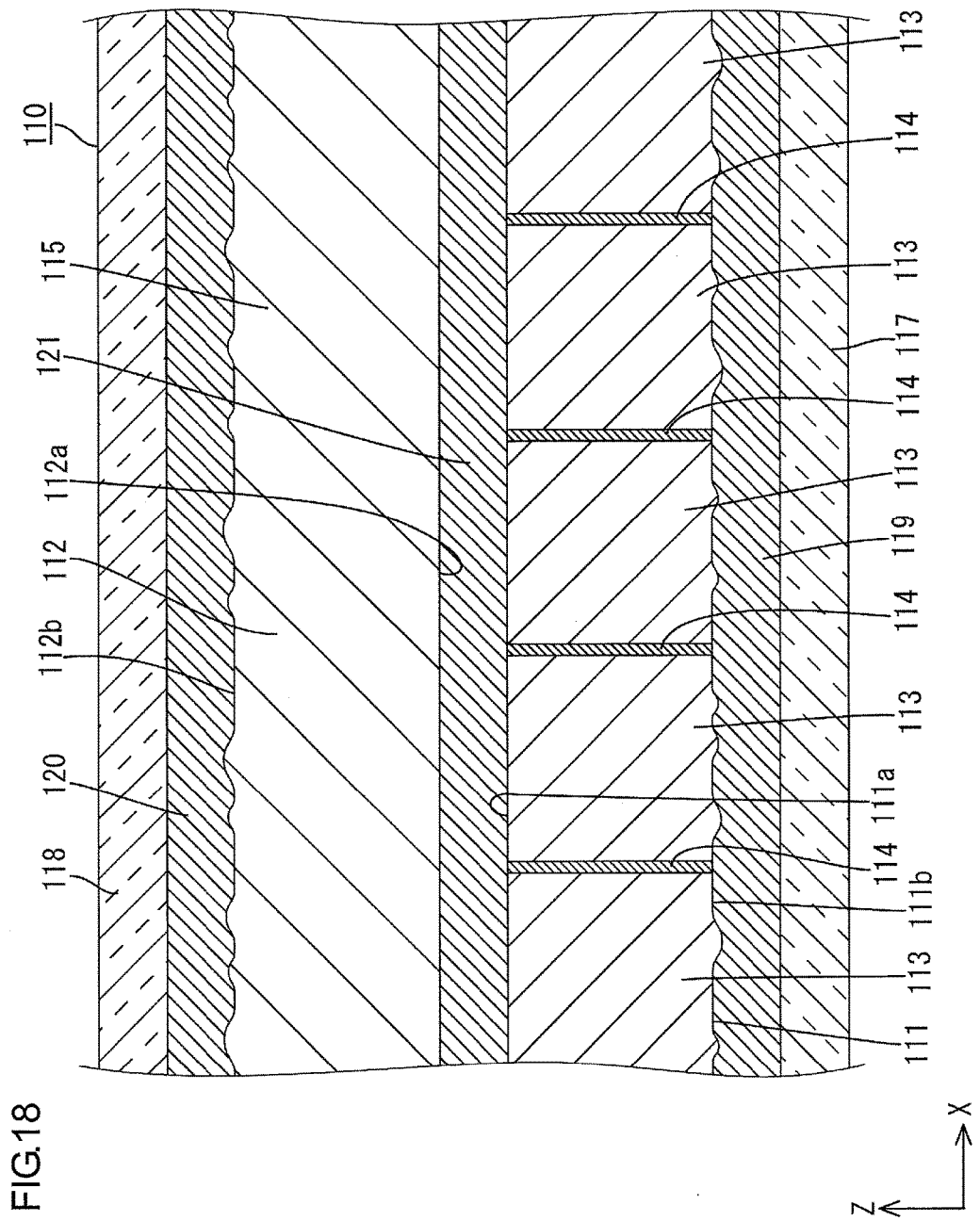
FIG. 18 is a cross-sectional view of a reflection imaging device according to a second embodiment of the present invention.

As illustrated in FIG. 18, a reflection imaging device 110 according to this embodiment includes the first component board 11 and the second component board 112 that include the inner plate surfaces 111a and 112a, respectively. The inner plate surfaces 111a and 112a are polished. The polished inner plate surfaces 111a and 112a have smoothness higher than outer plate surfaces 111b and 112b. The inner plate surface 111a of the first component board 111 and the inner plate surface 112a of the second component board 112 are opposed surfaces that are opposed to each other with a board adhesive layer 121. The inner plate surface 111a of the first component board 111 is a light exit surface for directing rays of light entering from the outside to the first component board 111 toward the second component board 112. The inner plate surface 112a of the second component board 112 is a light entrance surface for receiving the rays of light from the first component board 111. The inner plate surfaces 111a and 112a are polished to increase the smoothness. According to the configuration, the closeness in contact between the board adhesive layer 121 and the plate surfaces 111a and 112a increases. Therefore, the rays of light travel between the first component board 111 and the second component board 112 are less likely to be refracted and directions in which the rays of light travel are less likely to irregularly change. The optical performances of the reflection imaging device 110 further increase. Next, a method of producing the reflection imaging device 110 having the above configuration will be described.

As illustrated in FIGS. 19 to 24, the reflection imaging device 110 is produced through a first flat plate bonding step (a flat plate bonding process), a first polishing step (a polishing process), a second flat plate bonding step (a flat plate bonding process), a second polishing step, and a component board bonding step. The first flat plate bonding step is for bonding a first flat plate 117 to the first component board 111 prepared in the first component board preparing step. The first polishing step is for polishing the inner plate surface 111a of the first component board 111 to which the first flat plate 117 is bonded. The second flat plate bonding step is for bonding a second flat plate 118 to the second component board 112 prepared in the second component board preparing step. The second polishing step is for polishing the inner plate surface 112a of the second component board 112 to which the second flat plate 118 is bonded. The component board bonding step is for bonding the first component board 111 and the second component board 112 with the inner plate surfaces 111a and 112a opposed to each other.

Figure 19:
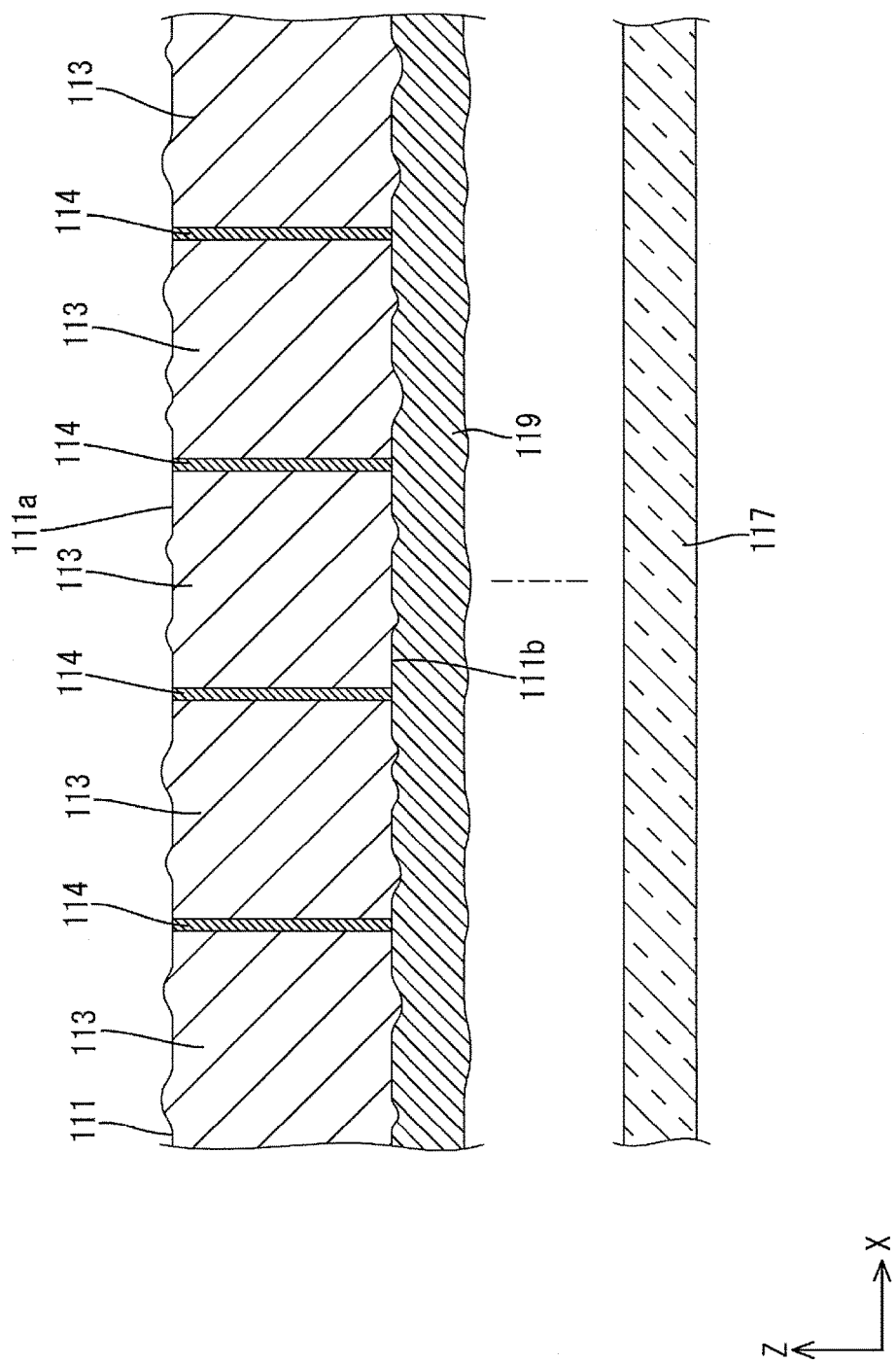
FIG. 19 is a cross-sectional view of a first component board and a first flat plate before bonded thereto for illustrating the method of producing the reflection imaging device.
Figure 20:
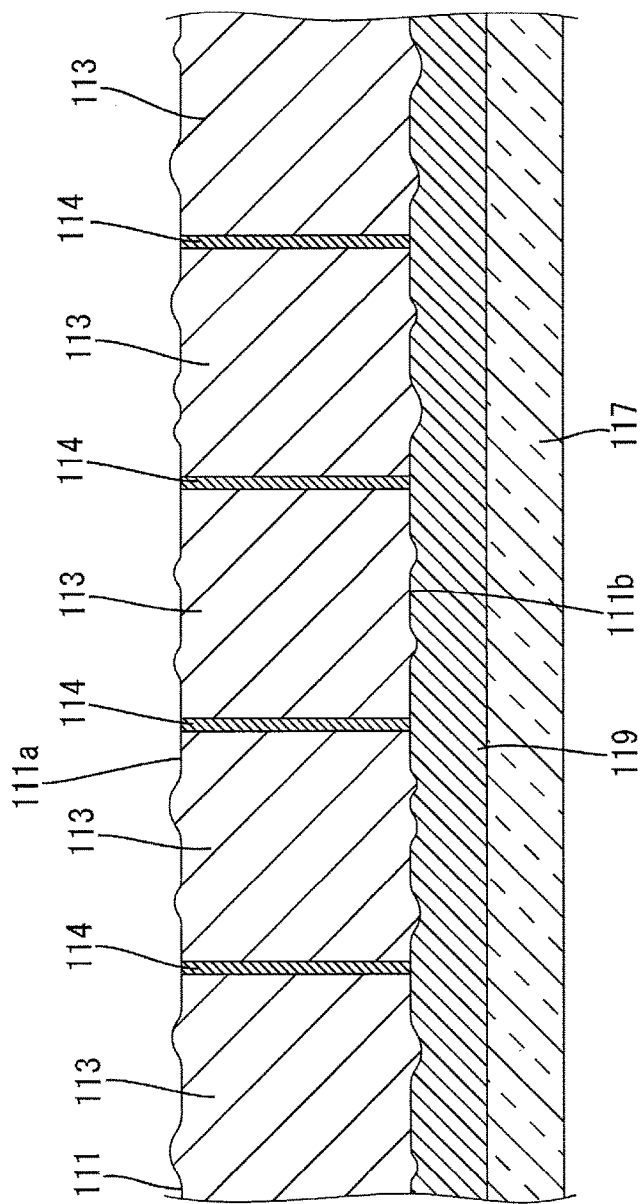
FIG. 20 is a cross-sectional view of the first component board and the first flat plate bonded thereto for illustrating the method of producing the reflection imaging device.
Figure 21:
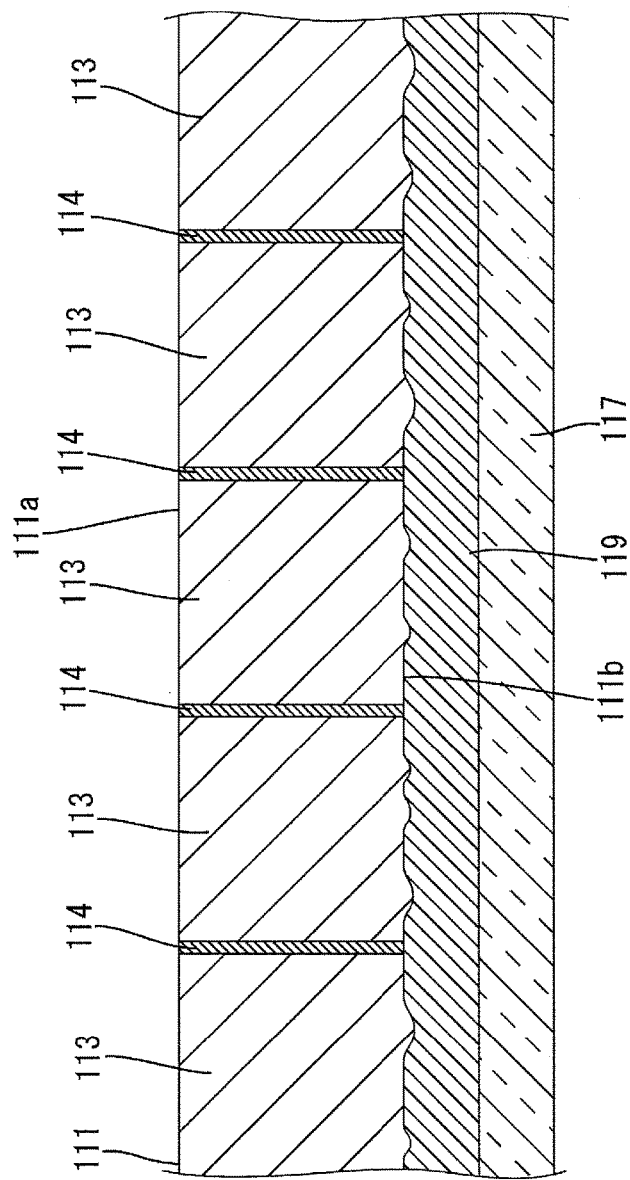
FIG. 21 is a cross-sectional view of the first component board with a polished inner plate surface for illustrating the method of producing the reflection imaging device.

As illustrated in FIG. 19, in the first flat plate bonding step, the ultraviolet curing resin in the liquid state to form the first flat plate adhesive layer 119 is applied to the outer plate surface 111b of the first component board 111 and the first flat plate 117 is bonded. Then, ultraviolet rays are applied to the ultraviolet curing resin in the liquid state to form the first flat plate adhesive layer 119. As a result, the ultraviolet curing resin is hardened and the first flat plate adhesive layer 119 is formed. As illustrated in FIG. 20, the first flat plate 117 is tightly fixed to the first component board 111. In the first polishing step that is performed next, an entire area of the inner plate surface 111a of the first component board 111 is polished by a polishing device, which is not illustrated. Specifically, the polishing device may include a polishing member such as a rubbing stone and the polishing member that spins at high speed is pressed against the inner plate surface 111a of the first component board 111. As a result, the inner plate surface 111a is polished. During the polishing, a significantly strong force is applied to the first component board 111 in a direction along the inner plate surface 111a (in the X-axis direction and the Y-axis direction). Due to the force, first light transmissive bases 113 (or first planar reflectors 114) fixed to one another may be removed from one another. In this embodiment, the first flat plate bonding step is performed prior to the first polishing step. Namely, the first flat plate 117 is already bonded to the first component board 111 on which the polishing is performed and mechanically enhanced. Therefore, the first component board 111 is less likely to be damaged during the polishing performed in the first polishing step. As illustrated in FIG. 21, asperities on the polished inner plate surface 111a of the first component board 111 are removed or reduced in size in comparison to the outer plate surface 111b. Namely, the smoothness is increased.

Figure 22:
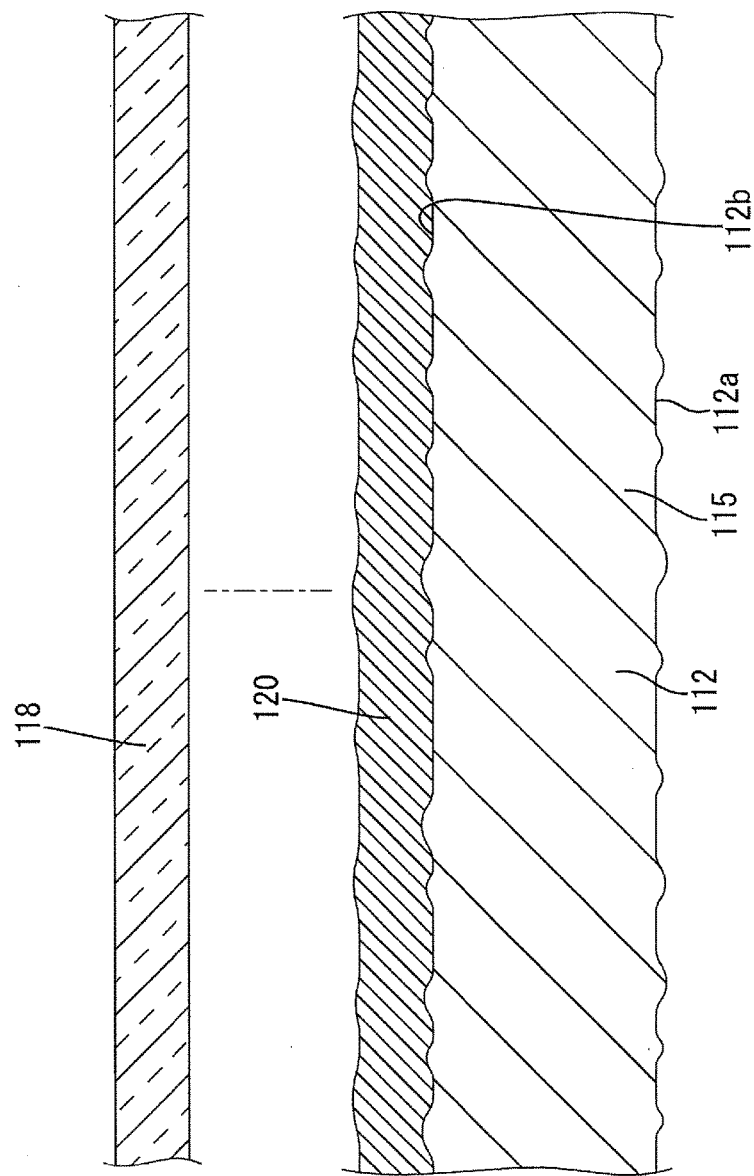
FIG. 22 is a cross-sectional view of a second component board and a second flat plate before bonded thereto for illustrating the method of producing the reflection imaging device.
Figure 23:
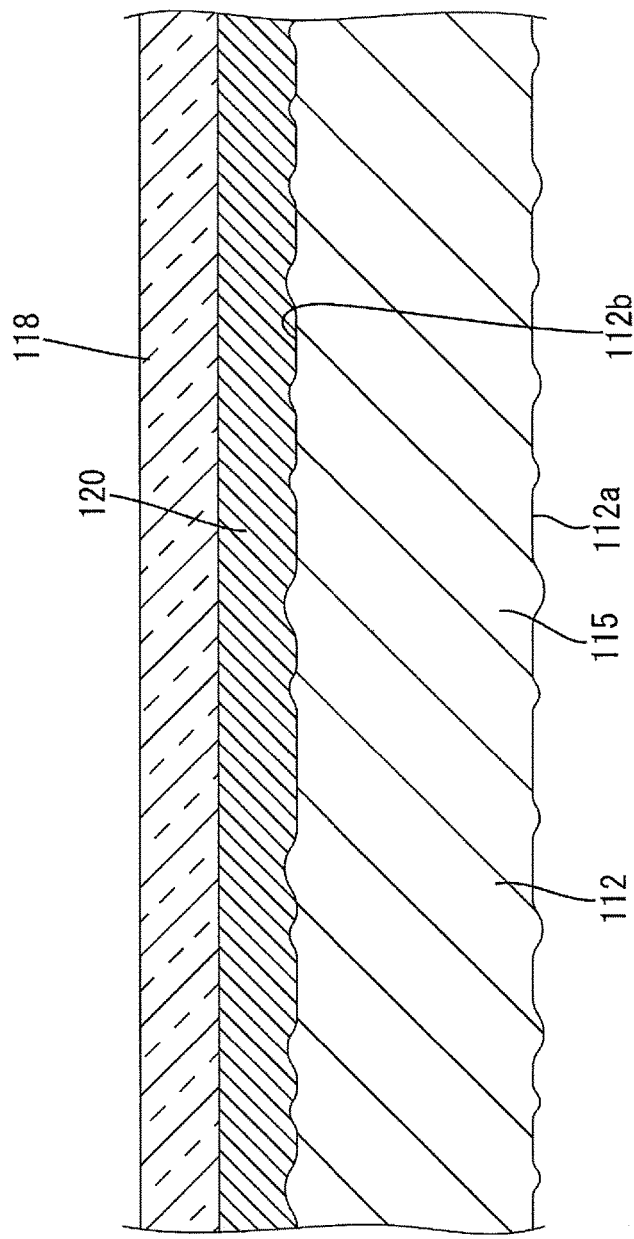
FIG. 23 is a cross-sectional view of the second component board and the second flat plate bonded thereto for illustrating the method of producing the reflection imaging device.
Figure 24:
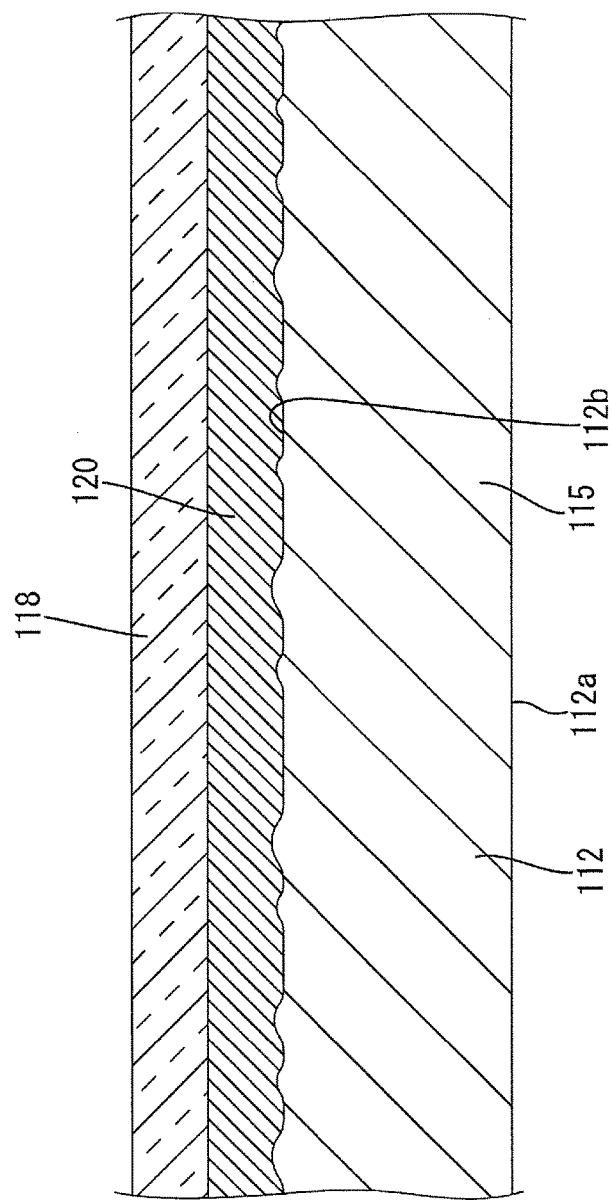
FIG. 24 is a cross-sectional view of the second component board with a polished inner plate surface for illustrating the method of producing the reflection imaging device.

As illustrated in FIG. 22, in the second flat plate bonding step, the ultraviolet curing resin in the liquid state to form the second flat plate adhesive layer 120 is applied to the outer plate surface 112b of the second component board 112 and the second flat plate 118 is bonded. Then, ultraviolet rays are applied to the ultraviolet curing resin in the liquid state to form the second flat plate adhesive layer 120. As a result, the ultraviolet curing resin is hardened and the second flat plate adhesive layer 120 is formed. As illustrate in FIG. 23, the second flat plate 118 is tightly fixed to the second component board 112. In the second polishing step that is performed next, an entire area of the inner plate surface 112a of the second component board 112 is polished by a polishing device, which is not illustrated. Specifically, the polishing device may include a polishing member such as a rubbing stone and the polishing member that spins at high speed is pressed against the inner plate surface 112a of the second component board 112. As a result, the inner plate surface 112a is polished. During the polishing, a significantly strong force may be applied to the second component board 112 in a direction along the inner plate surface 112a (in the X-axis direction and the Y-axis direction). Due to the force, second light transmissive bases 115 (or second planar reflectors 116) fixed to one another may be removed from one another. In this embodiment, the second flat plate bonding step is performed prior to the second polishing step. Namely, the second flat plate 118 is already bonded to the second component board 112 on which the polishing is performed and mechanically enhanced. Therefore, the second component board 112 is less likely to be damaged during the polishing performed in the second polishing step. As illustrated in FIG. 24, asperities on the polished inner plate surface 112a of the second component board 112 are removed or reduced in size in comparison to the outer plate surface 112b. Namely, the smoothness is increased.

The first component board 111 and the second component board 112 including the inner plate surfaces 111a and 112a, respectively, which are polished in the respective polishing steps are bonded with the board adhesive layer 121 as illustrated in FIG. 18 in the component board bonding step performed after the polishing steps. The component board bonding step is similar to that of the first embodiment and thus will not be described.

In the reflection imaging device 110 according to this embodiment, the inner plate surface 111a of the first component board 111 and the inner plate surface 112a of the second component board 112 are the polished surfaces on which the polishing is performed. Because the inner plate surface 111a of the first component board 111 and the inner plate surface 112a of the second component board 112 that are bonded together with the board adhesive layer 121 are the polished surfaces, the directions in which the rays of light travel are less likely to irregularly change when transmitting the inner plate surfaces 111a and 112a that are the polished surfaces. According to the configuration, the optical performances of the reflection imaging device 110 are further less likely to decrease.

The method of producing the reflection imaging device 110 according to this embodiment includes the first flat plate bonding step and the second flat plate bonding step (a flat plate bonding process) performed prior to the component board bonding step and the polishing steps and the polishing steps for polishing the inner plate surfaces 111a of the first component board 111 and the inner plate surface 112a of the second component board 112 performed after the first flat plate bonding step and the second flat plate bonding step but before the component board bonding step. Because the inner plate surface 111a of the first component board 111 and the inner plate surface 112a of the second component board 112 are polished in the polishing steps, the directions in which the rays of light travel are less likely to irregularly change when the rays of light transmitting through the inner plate surfaces 111a and 112a. Therefore, the optical performances of the reflection imaging device 110 are further less likely to decrease. Furthermore, the flat plates 117 and 118 are bonded to the outer plate surface 111b of the first component board 111 and the outer plate surface 112b of the second component board 112. The first component board 111 and the second component board 112 are enhanced by the flat plates 117 and 118. Therefore, the first light transmissive bases 113 and the second light transmissive bases 115 are less likely to be removed due to the forces that may be applied to the first component board 111 and the second component board 112 during the polishing.

Third Embodiment

A third embodiment according to the present invention will be described with reference to FIGS. 25 to 27. The third embodiment has a configuration different from the first embodiment in that it does not include the second flat plate included in the first embodiment and includes a second component board 212 that includes an outer plate surface 212b on which polishing is performed. Structures, functions, and effects similar to those of the first embodiment will not be described.

Figure 25:
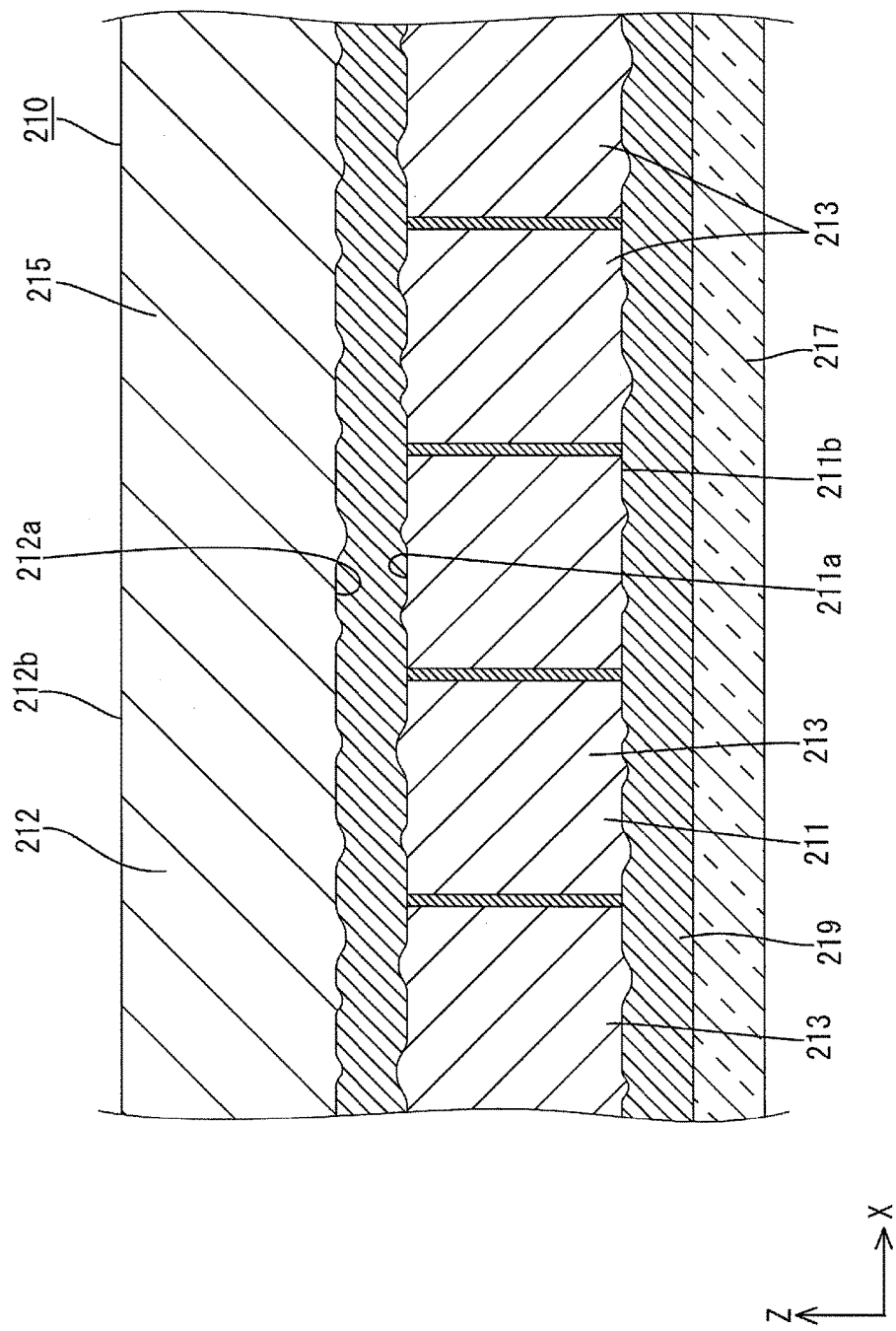
FIG. 25 is a cross-sectional view of a reflection imaging device according to a third embodiment of the present invention.

As illustrated in FIG. 25, a reflection imaging device 210 according to this embodiment includes the first component board 211 that includes an outer plate surface 211b to which a first flat plate 217 is bonded and the second component board 212 that include an outer plate surface 212b without the second flat plate included in the first embodiment described earlier. The outer plate surface 212b is exposed to the outside and a polished surface on which polishing is performed. In comparison to the inner plate surface 212a that is not polished or the plate surfaces 211a and 211b of the first component board 211, the outer plate surface 212b of the second component board 212 has the higher smoothness. The outer plate surface 212b of the second component board 212 is a light exit surface through which rays of light exit from the reflection imaging device 210 to a projection side. With the surface having the increased smoothness, a sufficient level of optical performances regarding the rays of exiting light is achieved. Furthermore, this embodiment does not include the second flat plate included in the first embodiment and thus the cost related to the second flat plate can be reduced. Next, a method of producing the reflection imaging device 210 having the above configuration will be described.

Figure 26:
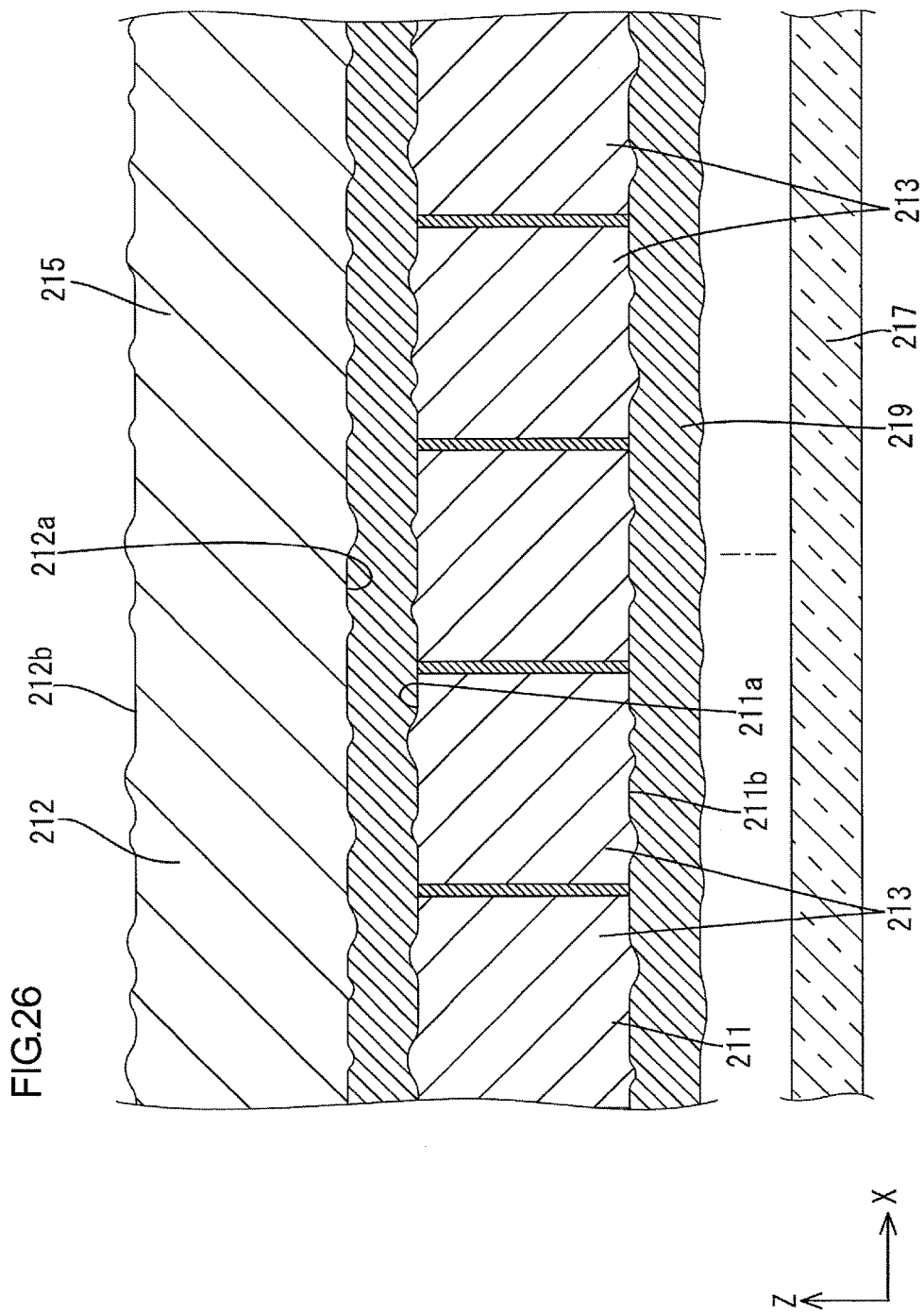
FIG. 26 is a cross-sectional view of a first component board and a second component board bonded together and a first flat plate before bonded thereto for illustrating the method of producing the reflection imaging device.
Figure 27:
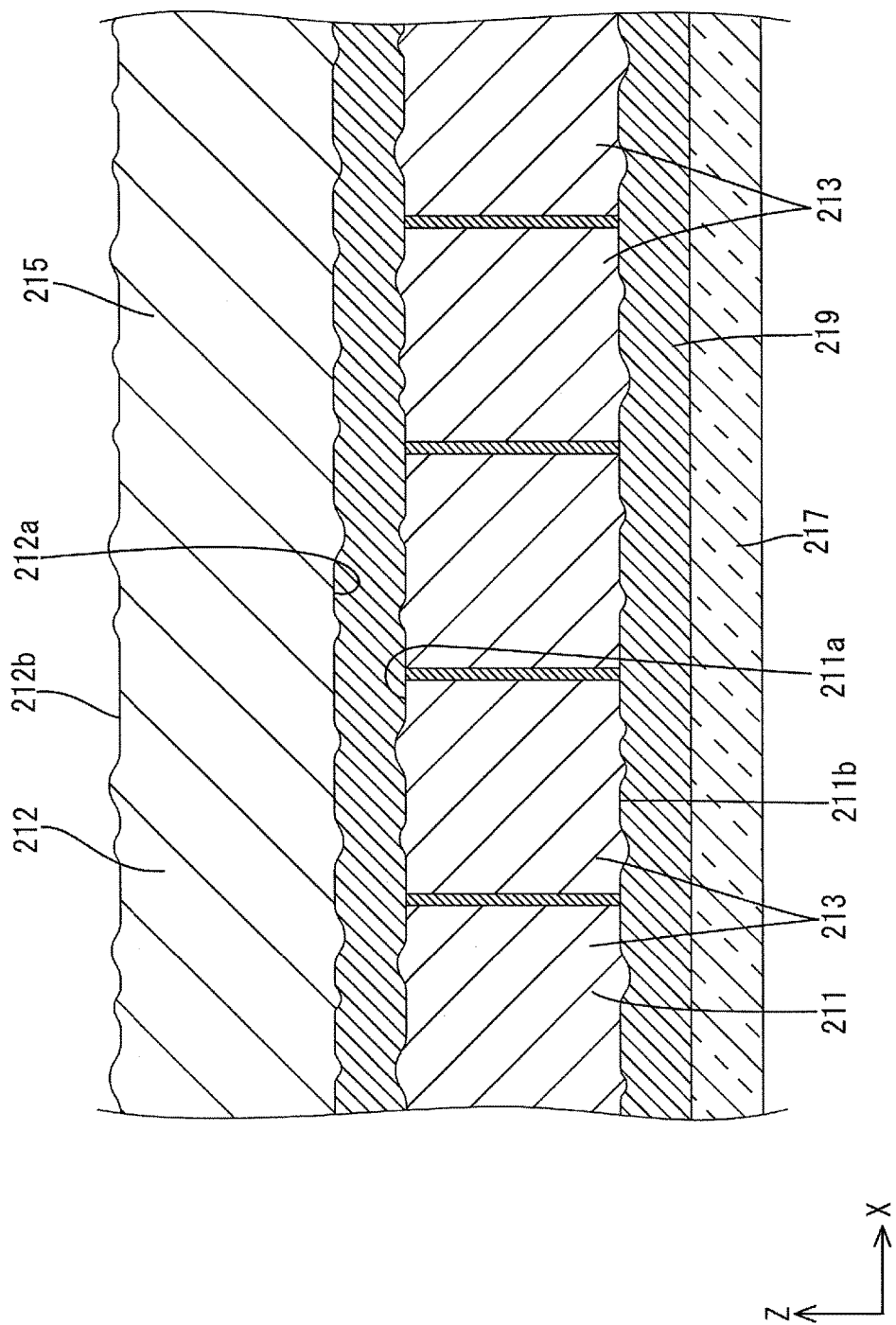
FIG. 27 is a cross-sectional view of the first component board and the second component board bonded together and a first flat plate bonded thereto for illustrating the method of producing the reflection imaging device.

As illustrated in FIGS. 26 and 27, the reflection imaging device 210 is produced through a component board bonding step, a flat plate bonding step, and a polishing step. The component board bonding step is for bonding the first component board 211 prepared in the first component board preparing step and the second component board 212 prepared in the second component board preparing step together with the inner plate surfaces 211a and 212a opposed to each other. The flat plate bonding step is for bonding the first flat plate 217 to the first component board 211. The polishing step is for polishing the outer plate surface 212b of the second component board 212.

Specifically, as illustrated in FIG. 26, the flat plate bonding step is performed after the component board bonding step in which the first component board 211 and the second component board 212 are bonded. As a result, the first flat plate 217 is bonded to the outer plat surface 211b of the first component board 211 as illustrated in FIG. 27. The component board bonding step and the flat plate bonding step are similar to the component board bonding step and the first flat plate bonding step of the first embodiment and thus will not be described. In the polishing step performed after those steps, an entire area of the outer plate surface 212b of the second component board 212 is polished by a polishing device, which is not illustrated. Specifically, the polishing device may include a polishing member such as a rubbing stone and the polishing member that spins at highspeed is pressed against the inner plate surface 212a of the second component board 212. As a result, the inner plate surface 212a is polished. During the polishing, a significantly strong force may be applied to the second component board 212 in a direction along the inner plate surface 212a (in the X-axis direction and the Y-axis direction). Due to the force, second light transmissive bases 215 (or second planar reflectors 216) fixed to one another may be removed from one another. In this embodiment, the flat plate bonding step is performed prior to the polishing step. Namely, the first component board 211 and the first flat plate 217 are already bonded to the second component board 212 on which the polishing is performed and mechanically enhanced. Therefore, the second component board 212 is less likely to be damaged during the polishing performed in the polishing step. As illustrated in FIG. 25, asperities on the polished outer plate surface 212b of the second component board 212 are removed or reduced in size in comparison to the inner plate surface 212a. Namely, the smoothness is increased.

In the reflection imaging device 210 according to this embodiment, the first flat plate (a flat plate) 217 is bonded to the first component board 211, which is one of the first component board 211 and the second component board 212, with the first flat plate adhesive layer (a flat plate adhesive layer) 219. The outer plate surface 212b of the second component board 212, which is the other one of the first component board 211 and the second component board 212 to which a flat plate is not bonded, is the polished surface on which the polishing is performed. Because the first flat plate 217 is bonded only to the first component board 211, which is one of the first component board 211 and the second component board 212, with the first flat plate adhesive layer 219, the number of the flat plats is reduced in comparison to a configuration in which the flat plates are bonded to both component boards. Regarding the second component board 212, which is the other one of the first component board 211 and the second component board 212 to which the first flat plate 217 is not bonded, the outer plate surface 212b is the polished surface on which the polishing is performed. The directions in which the rays of light travel are less likely to irregularly change when the rays of light transmit through the outer plate surface 212b. Therefore, the optical performances of the reflection imaging device 210 are further less likely to decrease.

The method of producing the reflection imaging device 210 according to this embodiment includes the flat plate bonding step in which the first flat plate (a flat plate) 217 is bonded to the first component board 211 and the polishing step performed after the flat plate bonding step and the component board bonding step. The first component board 211 is one of the first component board 211 and the second component board 212. The polishing step is for polishing the outer plate surface 212b of the second component board that is the other one of the first component board 211 and the second component board 212 to which the first flat plate 17 is not bonded. Because the first flat plate 217 is bonded only to the first component board 211, which is one of the first component board 211 and the second component board 212, in the flat plate bonding step, the number of the flat plates is reduced in comparison to the configuration in which the flat plates are bonded to both component boards. Regarding the second component board 212, which is the other one of the first component board 211 and the second component board 212 to which the first flat plate 217 is not bonded, the outer plate surface 212b is polished in the polishing step. Therefore, the optical performances are less likely to decrease. Furthermore, the first flat plate 217 is bonded to the outer plate surface 211b of the first component board 211, which is one of the first component board 211 and the second component board 212 to which the first flat plate 217 is bonded. Namely, the first component board 211 and the second component board 212 are enhanced with the first flat plate 217. According to the configuration, the second light transmissive bases 215 among the first light transmissive bases 213 and the second light transmissive bases 215 are less likely to be removed due to a force that may be applied to the second component board 212, which is the other one of the first component board 211 and the second component board 212 to which the first flat plate 217 is not bonded.

Fourth Embodiment

A fourth embodiment according to the present invention will be described with reference to FIGS. 28 to 31. The fourth embodiment has a configuration different from the first embodiment in that it does not include the first flat plate that is included in the first embodiment and includes a first component board 311 that includes an outer plate surface 311b and a second component board 312 that includes an inner plate surface 312a that are polished. Structures, functions, and effects similar to those of the first embodiment will not be described.

Figure 28:
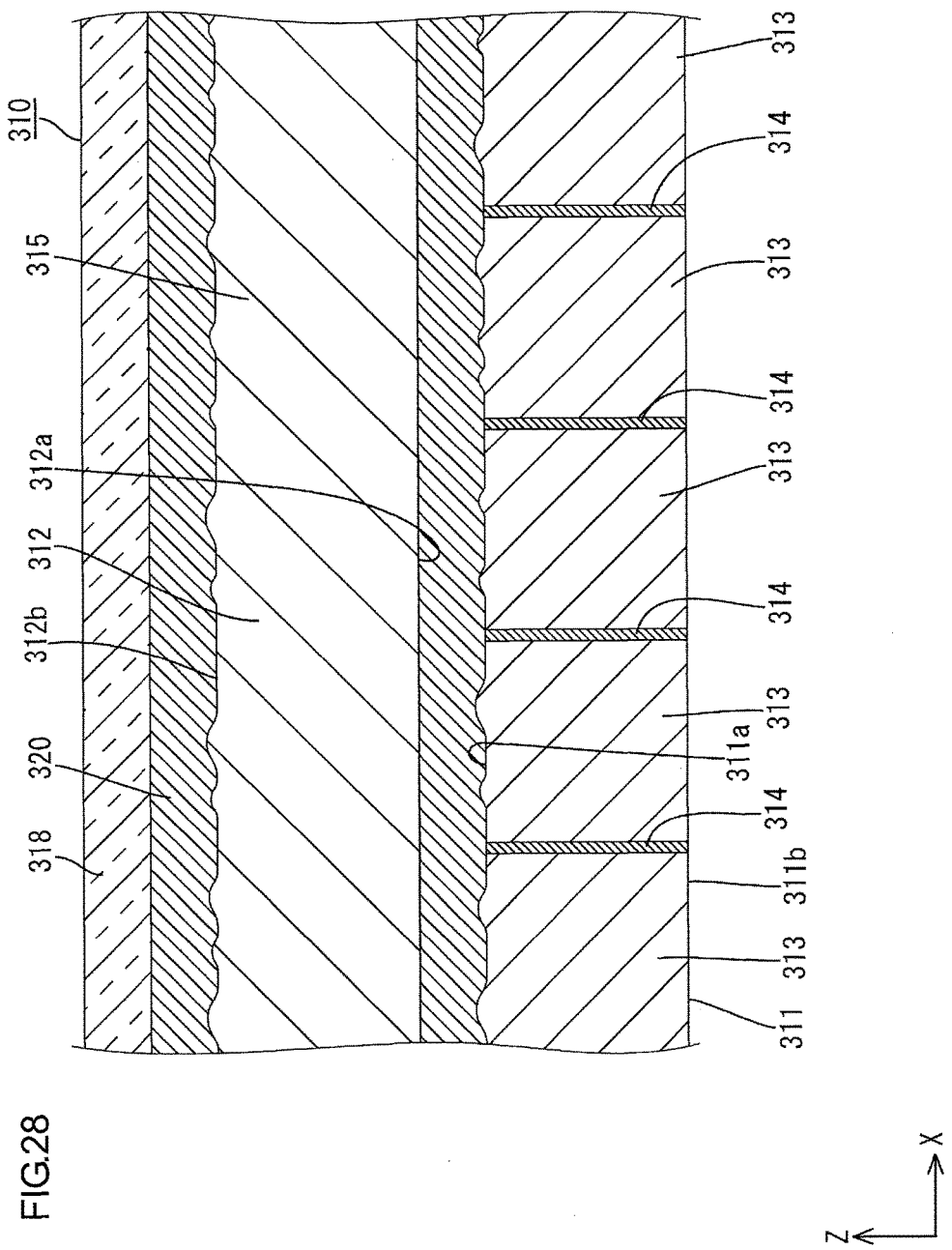
FIG. 28 is a cross-sectional view of a reflection imaging device according to a fourth embodiment of the present invention.

As illustrated in FIG. 28, a reflection imaging device 310 according to this embodiment includes the second component board 312 that includes an outer plate surface 312b to which a second flat plate 318 is bonded and the first component board 311 that includes the outer plate surface 311b to which the first flat plate included in the first embodiment is not bonded. The outer plate surface 311b is exposed to the outside and a polished surface on which polishing is performed. The inner plate surface 312a of the second component board 312 is a polished surface on which the polishing is performed. The outer plate surface 311b of the first component board 311 and the inner plate surface 312a of the second component board 312 have smoothness higher than the inner plate surface 311a of the first component board 311 and the outer plate surface 312b of the second component board 312 that are not polished. The outer plate surface 311b of the first component board 311 is a light entrance surface through which rays of light enter the reflection imaging device 310. By increasing the smoothness of the surface, a sufficient level of the optical performances for incidence rays of light is achieved. Because the first flat plate included in the first embodiment is not required, the cost related to the first flat plate can be reduced. Furthermore, the smoothness of the inner plate surface 312a of the second component board 312 opposite the first component board 311 is increased. Therefore, the optical performances further increase. Next, a method of producing the reflection imaging device 310 having the above configuration will be described.

Figure 29:
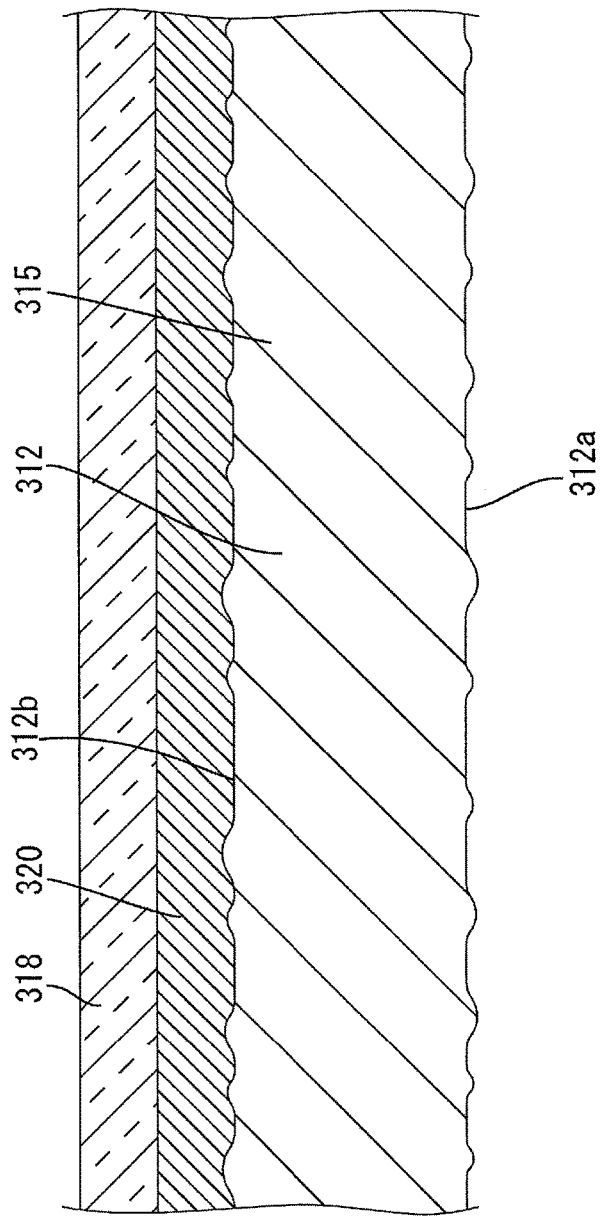
FIG. 29 is a cross-sectional view of a second component board and a second flat plate bonded thereto with an inner plate surface before polished for illustrating a method of the reflection imaging device.
Figure 30:
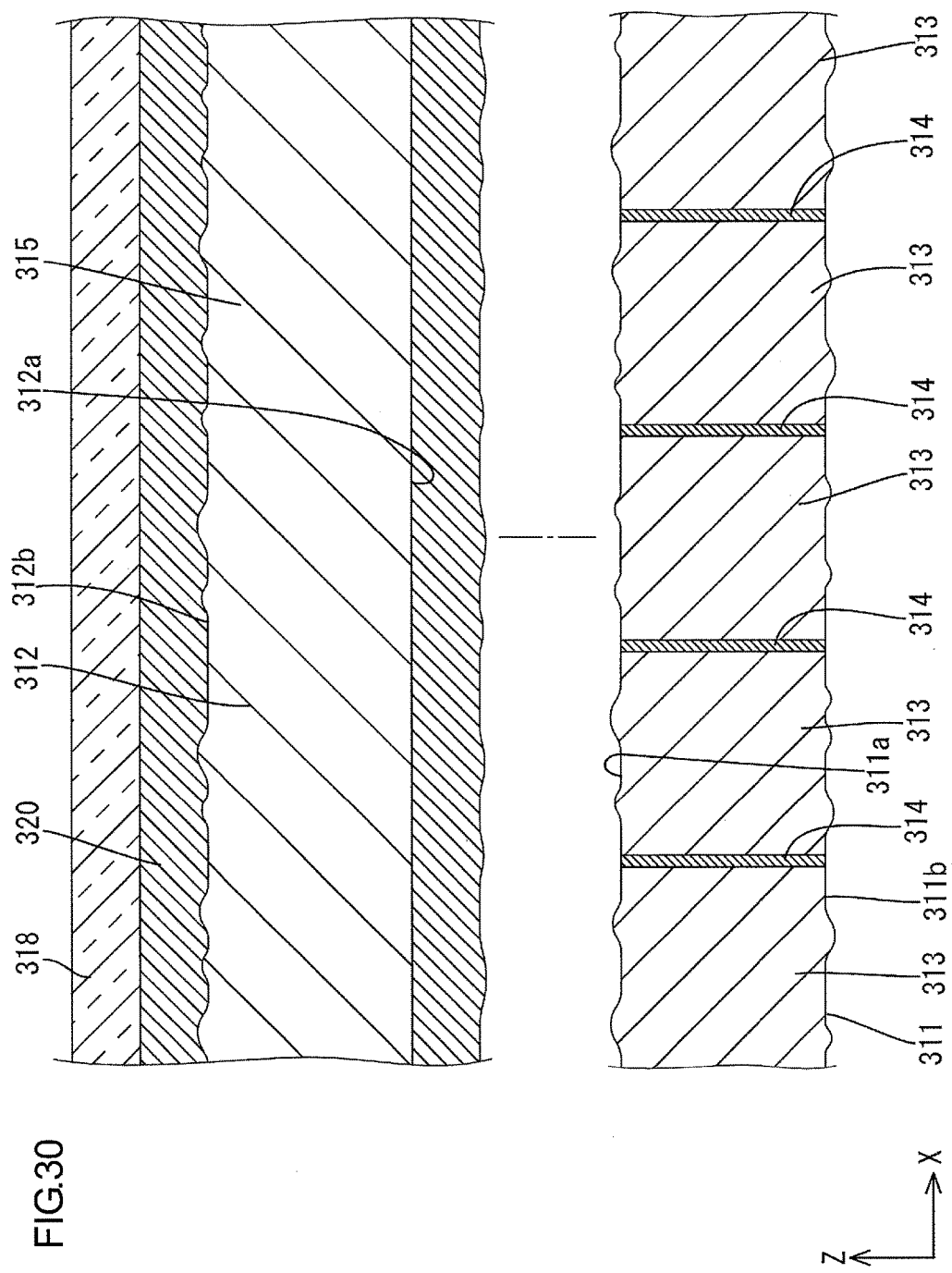
FIG. 30 is a cross-sectional view of the second component board with the polished inner plate surface and a first component board before bonded thereto for illustrating a method of the reflection imaging device.
Figure 31:
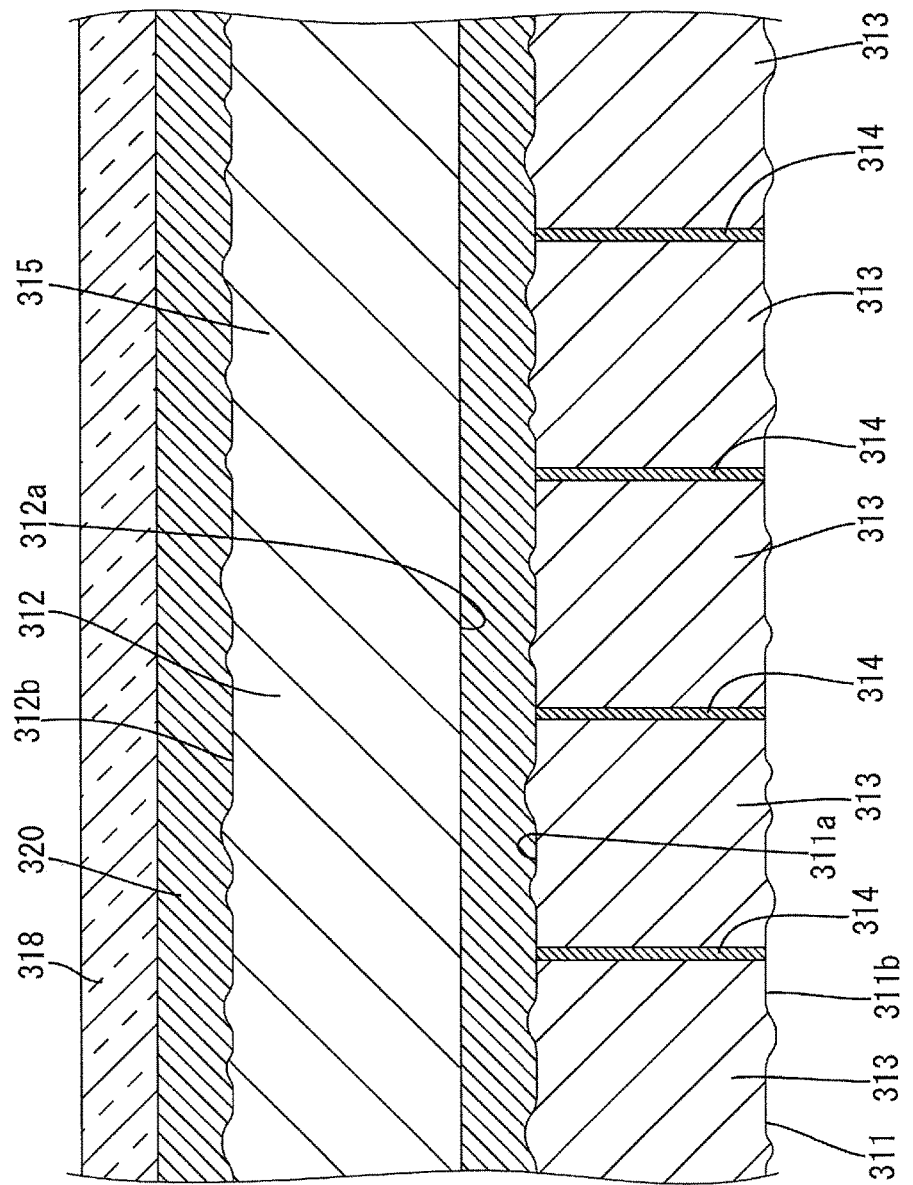
FIG. 31 is a cross-sectional view of the second component board with the polished inner plate surface and the first component board bonded thereto with an outer plate surface before polished for illustrating a method of the reflection imaging device.

As illustrated in FIGS. 29 to 31, the reflection imaging device 310 is produced through a flat plate bonding step, a first polishing step (a polishing process), a component board bonding step, and a first polishing step (a polishing process).

The flat plate bonding step is for bonding the second flat plate 319 to the second component board 312 prepared in the second component board preparing step. The first polishing step is for polishing the inner plate surface 312a of the second component board 312 to which the second flat plate 318 is bonded. The component board bonding step is for bonding the first component board 311 prepared in the first component board preparing step and the second component board 312 together with the inner plate surfaces 311a and 312a opposed to each other. The first polishing step is for polishing the outer plate surface 311b of the first component board 311.

As illustrated in FIG. 29, in the flat plate bonding step, the ultraviolet curing resin in the liquid state to form the second flat plate adhesive layer 320 is applied to the outer plate surface 312b of the second component board 312 and the second flat plate 318 is bonded to the outer plate surface 312b. Then, the ultraviolet rays are applied to the ultraviolet curing resin in the liquid state to form the second flat plate adhesive layer 320. The ultraviolet curing resin is hardened and the second flat plate adhesive layer 320 is formed. As a result, the second flat plate 318 is tightly fixed to the second component board 312. In the first polishing step performed next, an entire area of the inner plate surface 312a of the second component board 312 is polished by a polishing device, which is not illustrated. Specifically, the polishing device may include a polishing member such as a rubbing stone and the polishing member that spins at high speed is pressed against the inner plate surface 312a of the second component board 312. As a result, the inner plate surface 312a is polished. During the polishing, a significantly strong force may be applied to the second component board 312 in a direction along the inner plate surface 312a (in the X-axis direction and the Y-axis direction). Due to the force, second light transmissive bases 315 (or second planar reflectors 316) fixed to one another may be removed from one another. In this embodiment, the second flat plate bonding step is performed prior to the second polishing step. Namely, the second flat plate 318 is already bonded to the second component board 312 on which the polishing is performed and mechanically enhanced. Therefore, the second component board 312 is less likely to be damaged during the polishing performed in the first polishing step. As illustrated in FIG. 30, asperities on the polished outer plate surface 312b of the second component board 312 are removed or reduced in size in comparison to the outer plate surface 312b. Namely, the smoothness is increased.

Next, through the component board bonding step, the first component board 311 and the second component board 312 are bonded together as illustrated in FIG. 31. The component board bonding step is similar to the component bonding step of the first embodiment and thus will not be described. In the second polishing step performed after that, an entire area of the outer plate surface 311b of the first component board 311 is polished by a polishing device, which is not illustrated. Specifically, the polishing device may include a polishing member such as a rubbing stone and the polishing member that spins at high speed is pressed against the outer plate surface 311b of the first component board 311. As a result, the outer plate surface 311b is polished. During the polishing, a significantly strong force may be applied to the first component board 311 in a direction along the outer plate surface 311b (in the X-axis direction and the Y-axis direction). Due to the force, second light transmissive bases 313 (or second planar reflectors 314) fixed to one another may be removed from one another. In this embodiment, the flat plate bonding step is performed prior to the second polishing step. Namely, the second component board 312 and the second flat plate 318 are already bonded to the first component board 311 on which the polishing is performed and mechanically enhanced. Therefore, the first component board 311 is less likely to be damaged during the polishing performed in the polishing step. As illustrated in FIG. 28, asperities on the polished outer plate surface 311b of the first component board 311 are removed or reduced in size in comparison to the inner plate surface 311a. Namely, the smoothness is increased.

Fifth Embodiment

A fifth embodiment according to the present invention will be described with reference to FIGS. 32 to 34. This embodiment has a configuration different from the first embodiment in that it includes a first component board 411 that includes an outer plate surface 411b on which polishing is performed. Structures, functions, and effects similar to those of the first embodiment will not be described.

Figure 32:
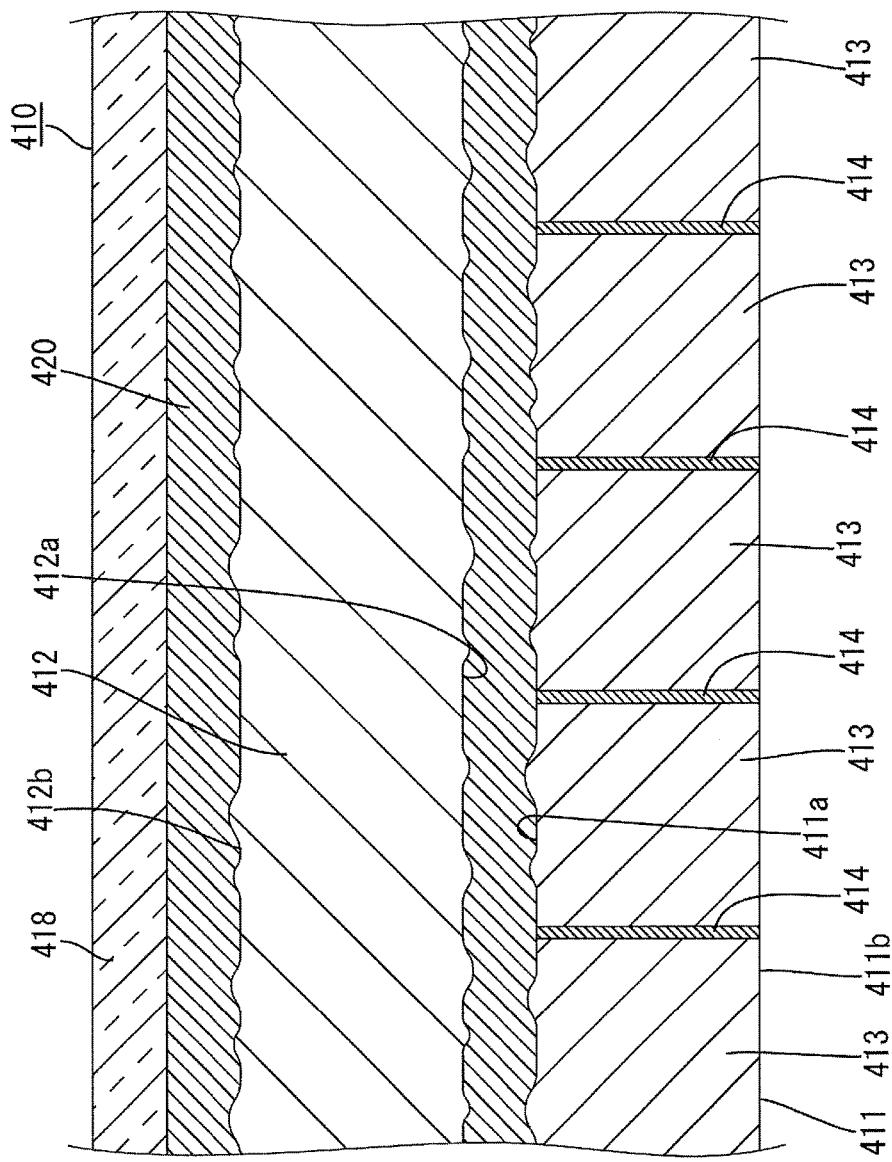
FIG. 32 is a cross-sectional view of a reflection imaging device according to a fifth embodiment of the present invention.

As illustrated in FIG. 32, a reflection imaging device 410 according to this embodiment includes a second component board 412 that includes an outer plate surface 412b to which a second flat plate 418 is bonded and the first component board 411 that includes the outer plate surface 411b to which the first flat plate included in the first embodiment is not bonded. The outer plate surface 411b of the first component board 411 is a polished surface on which the polishing is performed and exposed to the outside. In comparison to an inner plate surface 411a that is not polished or plate surfaces 412a and 412b of the second component board 412, the outer plate surface 411b of the first component board 411 has higher smoothness. The outer plate surface 411b of the first component board 411 is a light entrance surface through which rays of light enter to the reflection imaging device 410. By increasing the smoothness of the outer plate surface 411b, a sufficient level of optical performances for incidence rays of light is achieved. Next, a method of producing the reflection imaging device 410 having the above configuration will be described.

Figure 33:
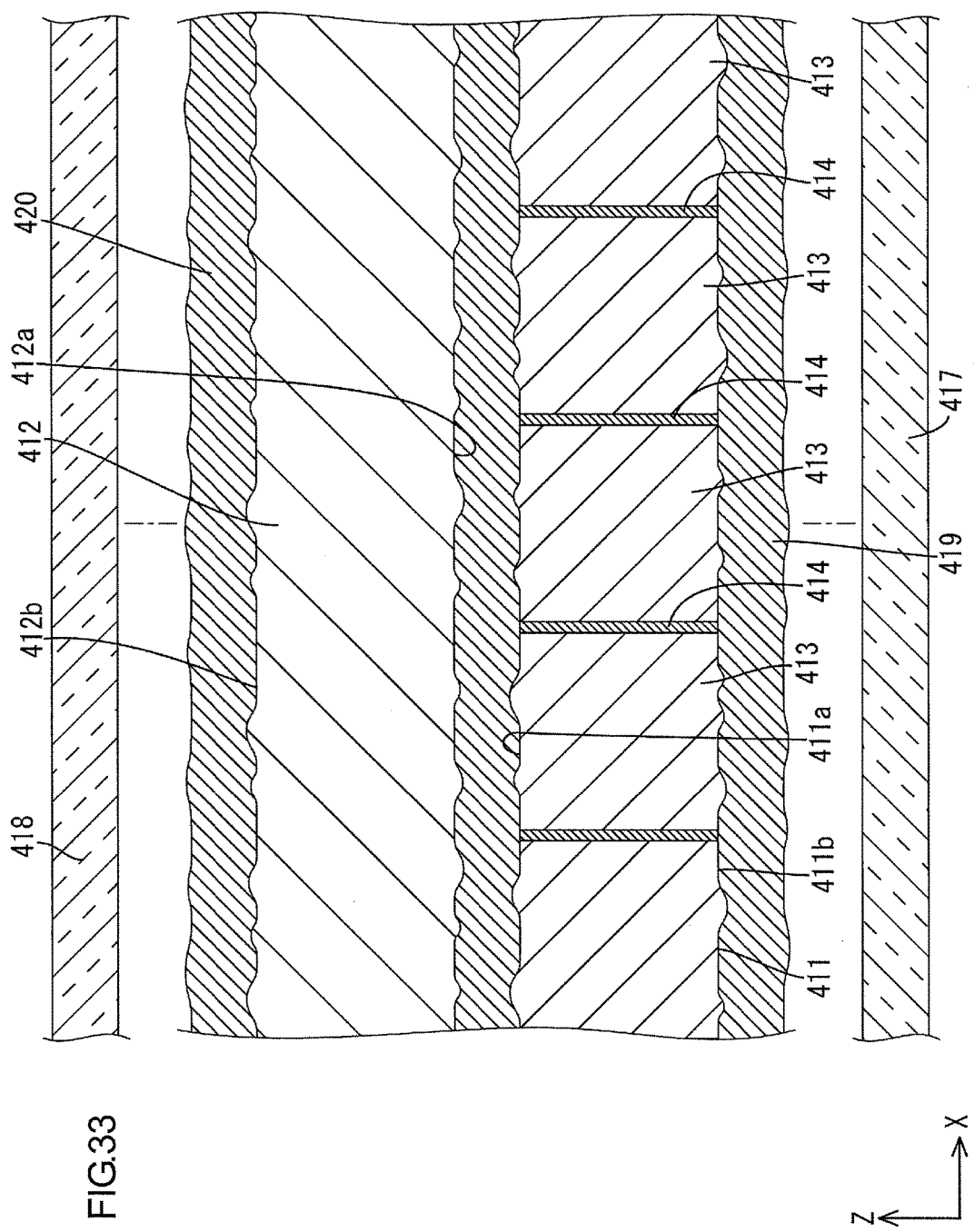
FIG. 33 is a cross-sectional view illustrating a first component board and a second component board bonded together and a first flat plate and a second flat plate before bonded thereto.
Figure 34:
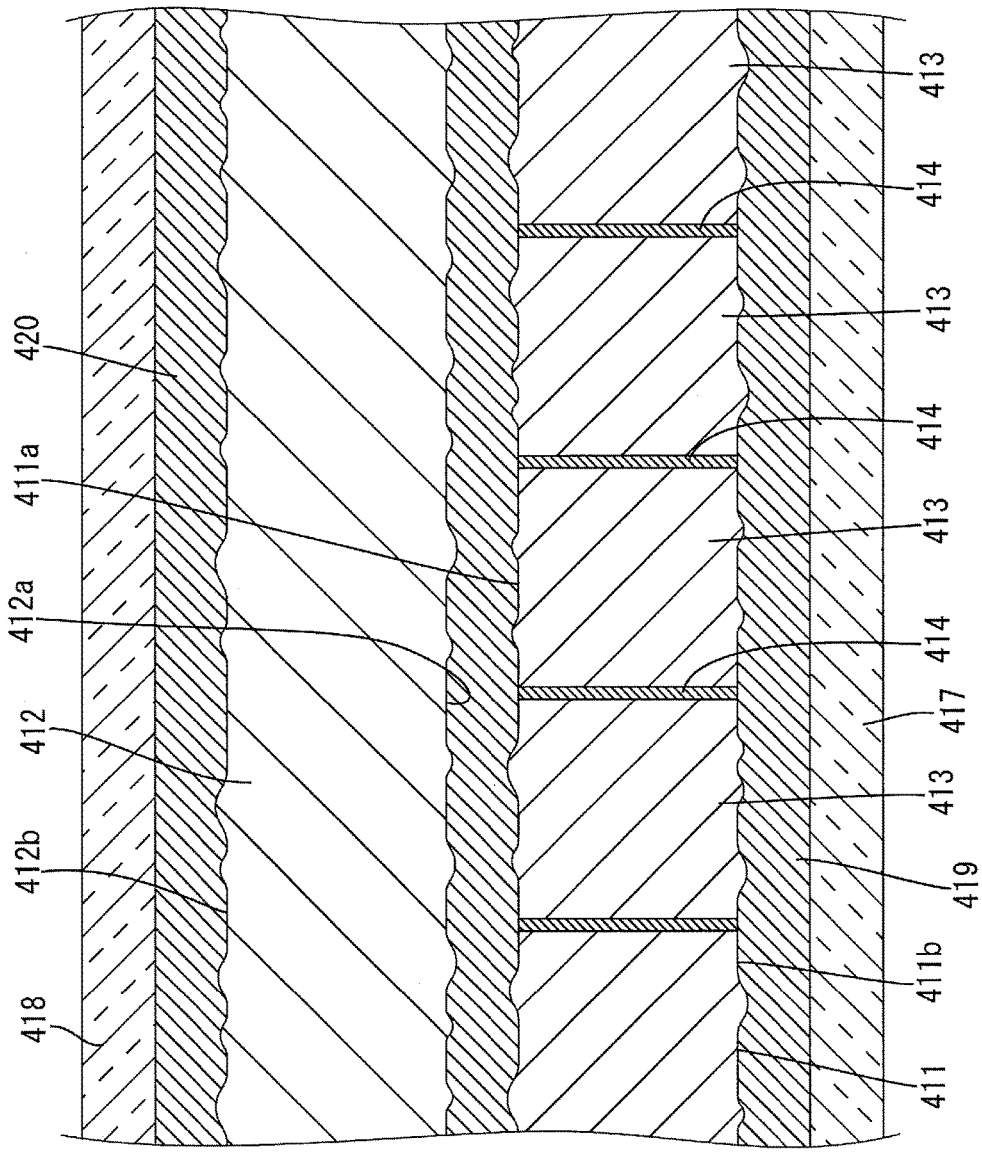
FIG. 34 is a cross-sectional view illustrating the first component board and the second component board bonded together and the first flat plate and the second flat plate bonded thereto.

As illustrated in FIGS. 33 and 34, the reflection imaging device 410 is produced through a component board bonding step, a first flat plate bonding step (a flat plate bonding process), a second plate bonding step (a flat plate bonding process), and a polishing step. The component board bonding step is for bonding the first component board prepared in the first component board preparing step and the second component board prepared in the second component board preparing step together with the inner plate surfaces 411a and 412a opposed to each other. The first flat plate bonding step is for bonding the first flat plate 417 to the first component board 411. The second flat plate bonding step is for bonding the second flat plate 418 to the second component board 412. The polishing step is for polishing the first flat plate 417, the first flat plate adhesive layer 419, and the outer plate surface 411b of the first component board 411.

Specifically, as illustrated in FIG. 33, the flat plate bonding steps are performed after the first component board 411 and the second component board 412 are bonded together in the component board bonding step. As illustrated in FIG. 34, the first flat plate 417 is bonded to the outer plate surface 411b of the first component board 411 with the first flat plate adhesive layer 419 and the second flat plate 418 is bonded to the outer plate surface 412b of the second component board 412 with the second flat plate adhesive layer 420. The component board bonding step and the flat plate bonding step are similar to the component board bonding step and the flat plate bonding step of the first embodiment and will not be described. In the polishing step performed after that, entire areas of the first flat plate 417, first flat plate adhesive layer 419, and the outer plate surface 411b of the first component board 411 are polished by a polishing device, which is not illustrated. Specifically, the polishing device may include a polishing member such as a rubbing stone and the polishing member that spins at high speed is pressed against the first flat plate 417. As a result, the first flat plate 417, the first flat plate adhesive layer 419, and the outer plate surface 411b of the first component board 411 are polished in sequence. Through the polishing, the first flat plate 417 and the first flat plate adhesive layer 419 are removed. During the polishing, a significantly strong force may be applied to the first component board 411 in a direction along the outer plate surface 411b (in the X-axis direction and the Y-axis direction). Due to the force, second light transmissive bases 313 (or first planar reflectors 414) fixed to one another may be removed from one another. In this embodiment, the flat plate bonding step is performed prior to the polishing step. Namely, the second component board 412 and the second flat plate 418 are already bonded to the first component board 411 on which the polishing is performed and mechanically enhanced. Therefore, the first component board 411 is less likely to be damaged during the polishing performed in the polishing step. As illustrated in FIG. 32, asperities on the polished outer plate surface 411b of the first component board 411 are removed or reduced in size in comparison to the inner plate surface 411a. Namely, the smoothness is increased.

Sixth Embodiment

A sixth embodiment according to the present invention will be described with reference to FIG. 35. The sixth embodiment has a configuration different from the fifth embodiment in that the second flat plate and the second flat plate adhesive layer are removed by polishing. Structures, functions, and effects similar to those of the fifth embodiment will not be described.

As illustrated in FIG. 35, a reflection imaging device 510 according to this embodiment includes a first component board and a second component board 512 that include an outer plate surfaces 511b and 512b, respectively. Flat plates are not bonded to the outer plate surfaces 511b and 512b. The outer plate surfaces 511b and 512b are polished surfaces on which polishing is performed and exposed to the outside. In comparison to inner plate surfaces 511a and 512a that are not polished, the outer plate surfaces 511b and 512b of the first component board 511 and the second component board 512 have higher smoothness. The outer plate surfaces 511b and 512b of the first component board 511 and the second component board 512 are a light entrance surface and a light exit surface, respectively, through which rays of light enter and exit from the reflection imaging device 510. By increasing the smoothness of those plate surfaces, sufficient levels of optical performances for the incidence rays of light and the exiting rays of light are achieved. The method of producing the reflection imaging device 510 includes a second polishing step for polishing the second flat plate, the second flat plate adhesive layer, and the outer plate surface 512b of the second component board 512 in addition to the polishing step (a first polishing step) for polishing the first flat plate, the first flat plate adhesive layer, and the outer plate surface 511b of the first component board 511 described in the fifth embodiment section. In the second polishing step, the second flat plate, the second flat plate adhesive layer, and the outer plate surface 512b of the second component board 512 are polished in this sequence by the polishing device similarly to the polishing step described in the fifth embodiment section. Through the polishing, the second flat plate and the second flat plate adhesive layer are removed.

OTHER EMBODIMENTS

The technology is not limited to the above embodiments described in the above description and the drawings. For example, the following embodiments may be included in technical scopes of the present invention.

(1) In each of the above embodiments, the smoothness of each plate surface of each flat plate is about equal to or higher than the smoothness of each plate surface of each component board on which the polishing is performed. However, the smoothness of each plate surface of each flat plate may be lower than the smoothness of each plate surface of each component board on which the polishing is performed as long as it is higher than the smoothness of each plate surface of each component board on which the polishing is not performed.

(2) In each of the above embodiments, the first component board is "the light entrance-side component board" through which rays of light from the liquid crystal display device enter and the second component board is "the light exit-side component board" through which the rays of light exit toward the projection side (the image forming side). However, a configuration that includes the first component board configured as "the light exit-side component board" and the second component board configured as "the light entrance-side component board" may be included in the scope of the present invention.

(3) In each of the above embodiments, the ultraviolet curing resin to form the board adhesive layer is applied to the inner plate surface of the first component board in the component board bonding step. However, the ultraviolet curing resin to form the board adhesive layer may be applied to the inner plate surface of the second component board in the component board bonding step. Alternatively, the ultraviolet curing resin to form the board adhesive layer may be applied to both first component board and second component board in the component board bonding step.

(4) In the first embodiment, the first flat plate bonding step is performed after the second flat plate bonding step is performed. However, the second flat plate bonding step may be performed after the first flat plate bonding step is performed.

(5) In the first embodiment, the flat plate bonding steps are performed after the component board bonding step is performed. However, the flat plate bonding steps may be performed and then the component board bonding step may be performed. Alternatively, the component board bonding step may be performed after the first flat plate bonding step (or the second flat plate bonding step) is performed and then the second flat plate bonding step (or the first flat plate bonding step) may be performed.

(6) In the second embodiment, the first flat plate bonding step and the second flat plate bonding step may be performed simultaneously or in sequence. The first polishing step and the second polishing step may be performed simultaneously or in sequence.

(7) In the third embodiment, the first flat plate is bonded to the first component board and only the outer plate surface of the second component board is polished. However, the second flat plate may be bonded to the second component board and only the outer plate surface of the first component board may be polished.

(8) In the fourth embodiment, the outer plate surface of the first component board and the outer plate surface of the second component board are polished. However, the inner plate surface of the first component board and the inner plate surface of the second component board may be polished. Alternatively, the inner plate surface and the outer plate surface of the first component board and the inner plate surface and the outer plate surface of the second component board may be polished, or the inner plate surface of the first component board and the inner plate surface and the outer plate surface of the second component board may be polished.

(9) In the fifth embodiment, the first flat plate, the first adhesive layer, and the outer plate surface of the first component board are polished in the production. However, the second flat plate, the second adhesive layer, and the outer plate surface of the second component board may be polished in the production.

(10) In each of the above embodiments, the refractive indexes of the light transmissive bases, the flat plates, and the flat plate adhesive layers of the component boards are equal to one another. However, the refractive indexes of the light transmissive bases, the flat plates, and the flat plate adhesive layers of the component boards may be slightly different from one another.

(11) In each of the above embodiments, the refractive indexes of the light transmissive bases of each component board and the board adhesive layer are equal to each other. However, the refractive indexes of the light transmissive bases of each component board and the board adhesive layer may be slightly different from each other.

(12) In each of the above embodiments, the light transmissive bases of the component boards are made of the same material. However, the light transmissive bases of the component boards may be made of different materials.

(13) In each of the above embodiments, the flat plates are made of the same material. However, the flat plates may be made of different materials.

(14) In each of the above embodiments, the board adhesive layer, the first flat plate adhesive layer, and the second flat plate adhesive layer are made of the ultraviolet curing resin. However, other types of curing resins may be used. For example, a light curing resin that is hardened by visible rays, a light curing resin that is hardened by both ultraviolet rays and visible rays, and a thermosetting resin that is hardened by heat may be used. Other than the curing resins, a double-sided tape that includes a substantially transparent base and adhesives applied to both sides of the base may be used.

(15) In each of the above embodiments, the first flat plate adhesive layer and the second flat plate adhesive layer are made of the same ultraviolet curing resin. However, the first flat plate adhesive layer and the second flat plate adhesive layer may be made of different materials.

(16) In each of the above embodiments, the board adhesive layer and the flat plate adhesive layers are made of the same ultraviolet curing resin. However, the board adhesive layer and the flat plate adhesive layers may be made of different materials.

(17) In each of the above embodiments, the reflection imaging device has the horizontally-long rectangular shape in a plan view. However, the present invention is applicable to a reflection imaging device having a vertically-long rectangular shape in a plan view. The shape of the reflection imaging device in a plan view may be altered as appropriate. For example, the present invention is applicable to a reflection imaging device having a square shape in a plan view, or reflection imaging devices having a round shape and an oval shape in a plan view, respectively. In each of the above embodiments, the component boards are prepared by either one of two methods. However, the component boards may be prepared by other methods.

(18) In each of the above embodiments, the reflection imaging device is used in combination with the liquid crystal display device. The configurations of the liquid crystal panel and the backlight unit in the liquid crystal display device may be altered as appropriate.

(19) In each of the above embodiments, the reflection imaging device is used in combination with the liquid crystal display device. However, the reflection imaging device may be used in combination with other type of display device that includes an organic EL panel or a plasma display panel (PDP).

(20) In each of the above embodiments, the reflection imaging device according to the present invention is used for projecting three-dimensional images of images that are displayed on the display device. However, the reflection imaging device according to the present invention may be used for projecting three-dimensional images of objects other than the display device (e.g., work of art) placed on a side of the reflection imaging device opposite to the projection side.

EXPLANATION OF SYMBOLS 10, 110, 210, 310, 410, 510: Reflection imaging device,
11, 111, 211, 311, 411, 511: First component board,
11a, 111a, 211a, 311a, 411a, 511a: Inner plate surface,
11b, 111b, 211b, 311b, 411b, 511b: Outer plate surface,
12, 112, 212, 312, 412, 512: Second component board,
12a, 112a, 212a, 312a, 412a, 512a: Inner plate surface,
12b, 112b, 212b, 312b, 412b, 512b: Outer plate surface,
13, 113, 213, 313, 413: First light transmissive base,
14, 114, 314, 414: First planar reflector,
15, 115, 215, 315: Second light transmissive base,
16: Second planar reflector,
17, 117, 217: First flat plate (a flat plate),
18, 118, 318, 418: Second flat plate (a flat plate),
19, 119, 219: First flat plate adhesive layer (a flat plate adhesive layer),
20, 120, 320, 420: Second flat plate adhesive layer (a flat plate adhesive layer),
21, 121: Board adhesive layer

The invention claimed is:
1. A reflection imaging device comprising:
a first component board including a plurality of first planar reflectors perpendicular to a plate surface and a plurality of first light transmissive bases having light transmissivity and extending parallel to the first planar reflectors, the first planar reflectors and the first light transmissive bases being alternately arranged;
a second component board including an inner plate surface opposed to an inner plate surface of the first component board and bonded thereto, the second component board including a plurality of second planar reflectors perpendicular to the plate surface and the first planar reflectors and a plurality of second light transmissive bases having light transmissivity and extending parallel to the second planar reflectors, the second planar reflectors and the second light transmissive bases being alternately arranged; and a flat plate in a single plate form and bonded to an outer plate surface of at least one of the first component board and the second component board opposed to the flat plate; wherein the flat plate and at least one of the first component board and the second component board are bonded together with a flat plate adhesive layer therebetween, the flat plate has a refractive index equal to a refractive index of at least one of the first light transmissive bases of the first component board and the second light transmissive bases of the second component board to which the flat plate is bonded, and the flat plate adhesive layer includes a material having a refractive index equal to the refractive index of the flat plate and the refractive index of the at least one of the first light transmissive bases of the first component board and the second light transmissive bases of the second component board to which the flat plate is bonded.

2. The reflection imaging device according to claim 1, wherein the flat plate adhesive layer includes a plurality of flat plate adhesive layers, and the flat plate includes a plurality of flat plates bonded to the outer plate surface of the first component board and the outer plate surface of the second component board with respective ones of the plurality of flat plate adhesive layers.

3. The reflection imaging device according to claim 1, wherein the flat plate is bonded to the at least one of the first component board and the second component board with the flat plate adhesive layer, and the outer plate surface of another one of the first component board and the second component board to which the flat plate is not bonded is a polished surface on which polishing is performed.

4. A reflection imaging device comprising:

a first component board including a plurality of first planar reflectors perpendicular to a plate surface and a plurality of first light transmissive bases having light transmissivity and extending parallel to the first planar reflectors, the first planar reflectors and the first light transmissive bases being alternately arranged;

a second component board including an inner plate surface opposed to an inner plate surface of the first component board and bonded thereto, the second component board including a plurality of second planar reflectors perpendicular to the plate surface and the first planar reflectors and a plurality of second light transmissive bases having light transmissivity and extending parallel to the second planar reflectors, the second planar reflectors and the second light transmissive bases being alternately arranged; and a flat plate in a single plate form and bonded to an outer plate surface of at least one of the first component board and the second component board opposed to the flat plate; wherein the first component board and the second component board are bonded together with a board adhesive layer therebetween, a refractive index of the first light transmissive bases and a refractive index of the second light transmissive bases are equal to each other, and the board adhesive layer includes a material having a refractive index equal to the refractive indexes of the first light transmissive bases and the second light transmissive bases.

5. The reflection imaging device according to claim 4, wherein the inner plate surfaces of the first component board and the second component board are polished surfaces on which polishing is performed.

6. A method of producing a reflection imaging device, the method comprising:

a component board bonding process of bonding a second component board to a first component board with an inner plate surface of the second component board opposed to an inner plate surface of the first component board, the first component board including a plurality of first planar reflectors perpendicular to a plate surface and a plurality of first light transmissive bases having light transmissivity and extending parallel to the first planar reflectors, the first planar reflectors and the first light transmissive bases being alternately arranged, the second component board including a plurality of second planar reflectors perpendicular to the plate surface and the first planar reflectors and a plurality of second light transmissive bases having light transmissivity and extending parallel to the second planar reflectors, the second planar reflectors and the second light transmissive bases being alternately arranged; and a flat plate bonding process of bonding a flat plate in a single plate form to an outer plate surface of at least one of the first component board and the second component board opposed to the flat plate; wherein the flat plate bonding process comprises bonding flat plates to the first component board and the second component board, respectively; and the method further includes a polishing process of polishing the inner plate surfaces of the first component board and the second component board performed between the flat plate bonding process that is performed prior to the component board bonding process.

7. The method according to claim 6, wherein the component board bonding process is performed prior to the flat plate bonding process.

* * * * *